US009092007B2

(12) United States Patent
Suzuki

(10) Patent No.: US 9,092,007 B2
(45) Date of Patent: Jul. 28, 2015

(54) INFORMATION PROCESSING APPARATUS AND IMAGE FORMING APPARATUS HAVING A FIRST AND SECOND STORAGE UNIT

(75) Inventor: Masayuki Suzuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 193 days.

(21) Appl. No.: 13/457,386

(22) Filed: Apr. 26, 2012

(65) Prior Publication Data

US 2012/0274992 A1 Nov. 1, 2012

(30) Foreign Application Priority Data

Apr. 26, 2011 (JP) ................................ 2011-098210

(51) Int. Cl.
*H04N 1/04* (2006.01)
*G03G 21/18* (2006.01)
*G03G 21/16* (2006.01)

(52) U.S. Cl.
CPC ........ *G03G 21/1885* (2013.01); *G03G 21/1657* (2013.01)

(58) Field of Classification Search
CPC ... G06F 3/1207; G06F 3/1222; G06F 3/1238; G06F 3/1259; G06F 3/1285; G06F 3/1292; G06F 1/30; G06F 3/1212; G06F 3/1226; G06F 11/2221; G06F 3/1209; G06F 3/121; G06F 3/1221; G06F 3/1229; H04N 1/00222; H04N 1/00233; H04N 1/00342; H04N 1/00923; H04N 2201/0082; H04N 2201/3205; H04N 1/32133; H04N 1/32138; H04N 1/32144; H04N 1/33369
USPC ........ 358/474; 235/375, 432; 399/13, 27, 111
See application file for complete search history.

(56) References Cited

U.S. PATENT DOCUMENTS 6,404,995 B1 * 6/2002 Kimizuka ....................... 399/13
2006/0219770 A1 * 10/2006 Oyama ......................... 235/375

FOREIGN PATENT DOCUMENTS

| | | | |
|---|---|---|---|
| EP | 1 510 873 | A1 | 3/2005 |
| JP | 07-287441 | | 10/1995 |
| JP | 2003-271021 | | 9/2003 |
| JP | 2004-020910 | A | 1/2004 |
| JP | 2006-201381 | | 8/2006 |
| JP | 2007-199457 | A | 8/2007 |
| JP | 2011-053410 | A | 3/2011 |

OTHER PUBLICATIONS

Takahata et al., Image Formation Device, Developing Unit, and Computer System, Mar. 2, 2005, EP 1510873 A1.*

* cited by examiner

*Primary Examiner* — Martin Mushambo
(74) *Attorney, Agent, or Firm* — Rabin & Berdo, P.C.

(57) ABSTRACT

An information processing apparatus includes a first storage unit that stores first information regarding a first unit, a second storage unit that stores second information regarding a second unit, and a reading unit disposed so as to face the first unit and the second unit. The reading unit reads the first information stored in the first storage unit and the second information stored in the second storage unit.

34 Claims, 17 Drawing Sheets

INFORMATION PROCESSING APPARATUS AND IMAGE FORMING APPARATUS HAVING A FIRST AND SECOND STORAGE UNIT

BACKGROUND OF THE INVENTION

The present invention relates to an image processing apparatus such as an image forming apparatus.

There are various kinds of image processing apparatuses to which replaceable units are detachably mounted. For example, Japanese Laid-open Patent Publication No. 2007-199457 discloses an image forming apparatus having a replaceable toner cartridge. The toner cartridge is provided with an RFID (Radio Frequency Identification Device) tag storing information on the toner cartridge. Information stored in the RFID tag is read by a communication unit of the image forming apparatus.

However, in the conventional art, a single communication unit only reads information from a single RFID tag.

SUMMARY OF THE INVENTION

In an aspect of the present invention, it is intended to provide an image processing apparatus capable of obtaining information from a plurality of storage units using a single communication unit.

According to an aspect of the present invention, there is provided an information processing apparatus including a first storage unit that stores first information regarding a first unit, a second storage unit that stores second information regarding a second unit, and a reading unit disposed so as to face the first storage unit and the second storage unit. The reading unit reads the first information stored in the first storage unit and the second information stored in the second storage unit.

With such a configuration, it becomes possible to obtain information from the first and second storage units using the single reading unit.

According to another aspect of the present invention, there is provided an information processing apparatus including a first storage unit that stores first information regarding a first unit, a second storage unit that stores second information regarding a second unit, and a reading unit disposed at a position where the reading unit is capable of reading the first information stored in the first storage unit and the second information stored in the second storage unit.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
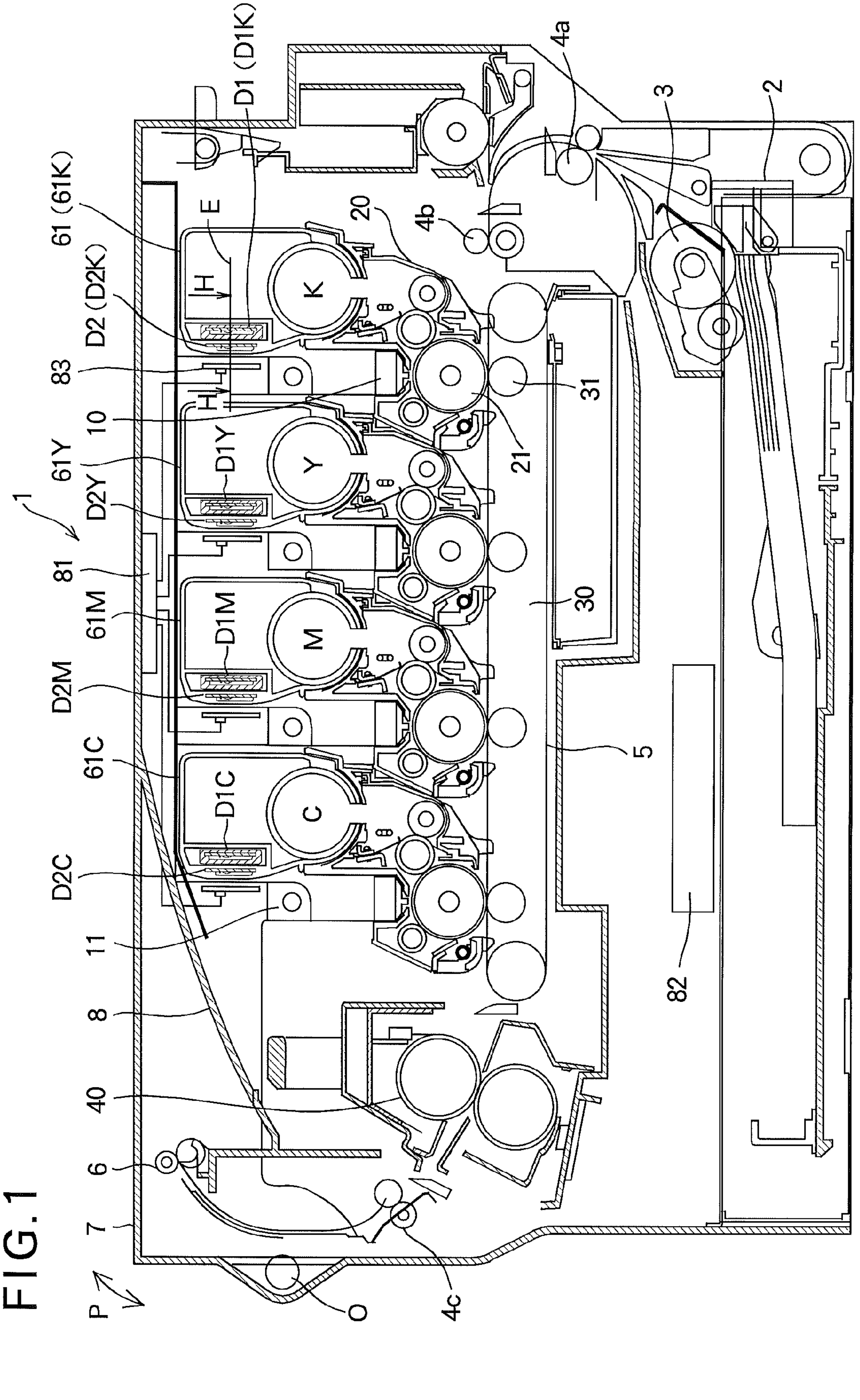
FIG. 1 is a sectional view showing a configuration of an image forming apparatus as an example of an information processing apparatus according to Embodiment 1 of the present invention.

Hereinafter, embodiments of the present invention will be described with reference to drawings. The drawings are provided for illustrative purpose and are not intended to limit the scope of the present invention. In respective drawings, common or similar components or are denoted by the same reference numerals.

Embodiment 1

<Configuration of Image Forming Apparatus>

An image forming apparatus as an example of an information processing apparatus according to Embodiment 1 of the present invention will be described with reference to FIG. 1.

FIG. 1 shows a configuration of an image forming apparatus as an example of an information processing apparatus according to Embodiment 1.

Among information processing apparatuses, there are types of information processing apparatuses to which replaceable units are detachably mounted. In particular, there are types of information processing apparatuses configured to obtain management information regarding the replaceable units from the replaceable units, and perform operations based on the management information.

The information processing apparatuses of these types are embodied as various kinds of apparatuses. For example, the information processing apparatus can be embodied as, for example, an image forming apparatus 1 as shown in FIG. 1 such as a printer, a copier, a facsimile machine or a combined machine. The image forming apparatus 1 shown in FIG. 1 is configured as a tandem type color electrophotographic printer employing a direct transfer system. Hereinafter, the image forming apparatus 1 will be referred to as a printer 1. An image forming operation will be referred to as a printing operation.

As shown in FIG. 1, the printer 1 includes a feeding cassette 2 provided at a lower part thereof. A feeding mechanism 3 is provided at an end of the feeding cassette 2. The feeding cassette 2 (i.e., a medium storage portion) is configured to store sheets as recording media. The feeding mechanism 3 (i.e., a medium feeding portion) is configured to feed individual sheets one by one into a medium feeding path.

Conveying roller portions 4*a* and 4*b* are provided along the medium feeding path. The conveying roller portions 4*a* and 4*b* (i.e., medium conveying members) are configured to convey the sheet to a conveying belt 5. The conveying belt 5 (i.e., a medium conveying member) is configured to convey the sheet along developing units 20 (described below) toward a fixing unit 40.

The printer 1 includes four developing units 20 for forming images of black (K), yellow (Y), magenta (M) and cyan (C). The developing units 20 have the same configuration except developers (toners). Hereinafter, when distinction among colors is necessary, the developing units 20 and components thereof will be referred to by adding characters K, Y, M and C to ends of the respective reference numerals.

Each developing unit 20 includes a photosensitive drum 21 as an image bearing body, and is configured to form a developer image (i.e., a toner image) on the surface of the photosensitive drum 21. The developing unit 20 is detachably mounted to the printer 1. The developing unit 20 is also referred to as an image forming unit (or a process unit). A detailed description of the developing unit 20 will be made later.

Along a circumference of the photosensitive drum 21 of each developing unit 20, an exposure unit 10 and a transfer roller 31 of a transfer unit 30 are provided. In the example shown in FIG. 1, the exposure units 10 are provided above the photosensitive drums 21, and the transfer rollers 31 are provided below the photosensitive drum 21.

Each exposure unit 10 is configured to emit light so as to selectively expose the surface of the photosensitive drum 21 based on a printing command sent from a host device (not shown) to thereby form a latent image on the surface of the photosensitive drum 21. The exposure units 10 are constituted by, for example, LED (Light Emitting Diode) heads, and therefore the exposure units 10 will be hereinafter referred to as LED heads 10. In this embodiment, the LED heads 10 are mounted to an upper cover 7 of the printer 1 via holder portions 11. Each holder portion 11 has a communication antenna 83 as a reading unit (or a communication unit) for wireless communication with data carriers D1 and D2 described later.

Each developing unit 20 is configured to develop the latent image formed on the photosensitive drum 21 using the developer, so as to form a developer image (i.e., a visualized image). The developer will be hereinafter referred to as a toner, and the developer image will be hereinafter referred to as a toner image.

The transfer unit 30 is configured to transfer the toner images from the surfaces of the photosensitive drums 21 to the sheet. The transfer unit 30 includes transfer rollers 31 and the conveying belt 5. The transfer rollers (i.e., transfer members) 31 are configured to attract the toner images from the surfaces of the photosensitive drums 21 and transfer the toner images to the sheet on the conveying belt 5. The transfer rollers 31 are provided on an inner circumferential side of the conveying belt 5. The conveying belt 5 is configured to convey the sheet along the photosensitive drums 21K, 21Y, 21M and 21C of the developing units 20K, 20Y, 20M and 20C.

Each transfer roller 31 is applied with a voltage of an opposite polarity to the toner image. With the voltage, the transfer roller 31 attracts the toner image from the surface of the photosensitive drum 21. The conveying belt 5 conveys the sheet through a nip portion between the transfer roller 31 and the photosensitive drum 21, so that the toner image is transferred from the photosensitive drum 21 to the sheet.

In a color printing operation, the printer 1 causes the developing units 20K, 20Y, 20M and 20C to form images of four colors, and transfer the toner images of four colors to the sheet in an overlapping manner. As a result, a color toner image is transferred to the surface of the sheet.

The conveying belt 5 conveys the sheet (to which the color image is transferred) to the fixing unit 40. The fixing unit 40 applies heat and pressure to the sheet so that the toner is molten and is fixed to the sheet.

The printer 1 includes a conveying roller portion 4*c* and an ejection roller portion 4*d* that eject the sheet (to which the color toner image is fixed) to outside the printer 1. The ejected sheet is placed on a stacker 8 provided on the upper cover 7.

<Configurations of Replaceable Units>

The developing units 20 are configured as replaceable units detachably mounted to the printer 1. The developing units 20 have detachable toner cartridges 61 (FIG. 2) as replaceable units. The developing units 20 and the toner cartridges 61 are both detachably mounted to the printer 1 as a main body apparatus. The developing unit 20 will also be referred to as a first replaceable unit (i.e., a first unit). The toner cartridge 61 will also be referred to as a second replaceable unit (i.e., a second unit). In this regard, the printer 1 is configured so that the upper cover 7 is openable so as to allow replacements of the developing units 20 and the toner cartridges 61.

Next, description will be made of replaceable units (i.e., the developing units 20 and the toner cartridges 61) according to Embodiment 1.

Figure 2:
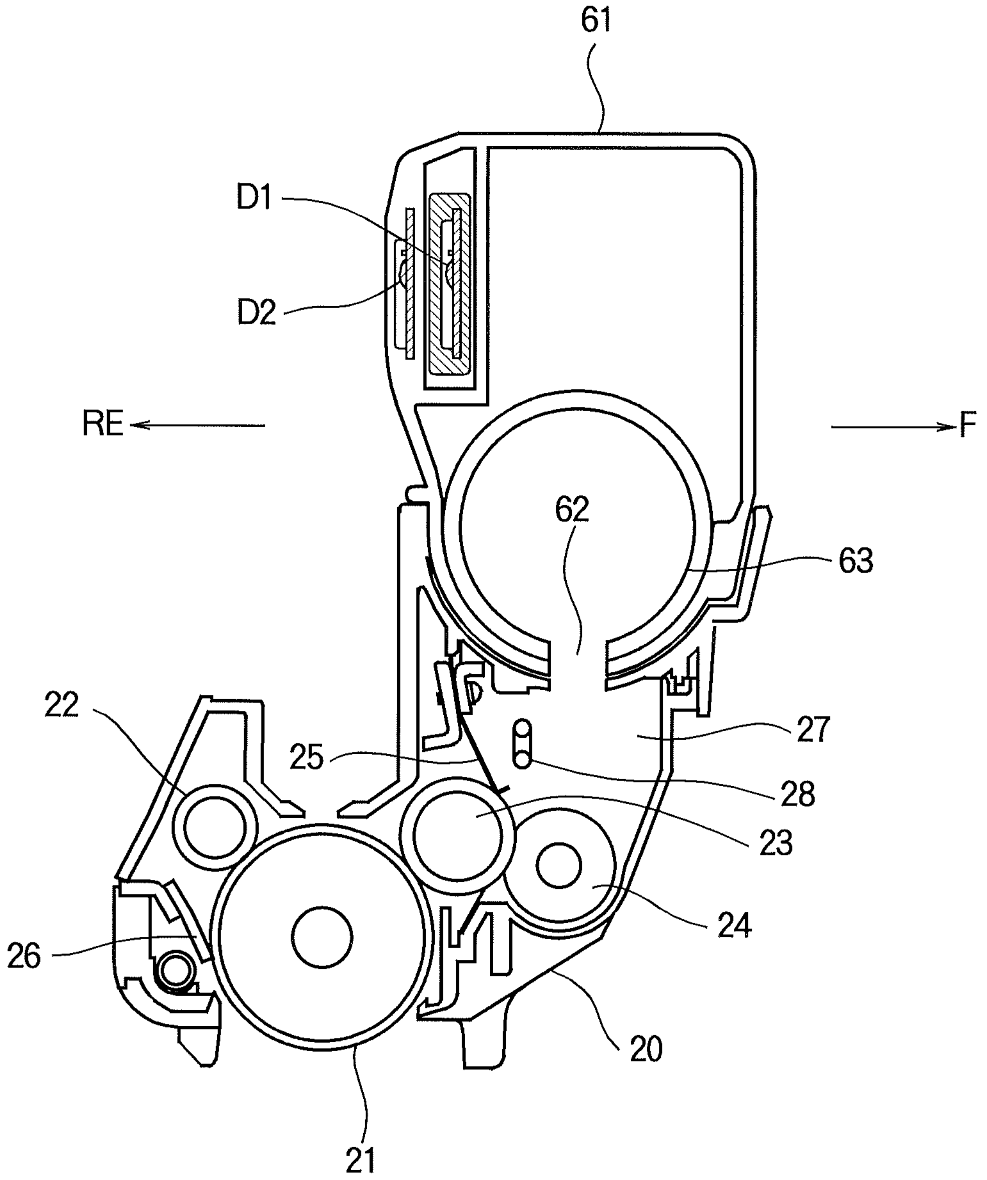
FIG. 2 is a sectional view showing configurations of a developing unit and a toner cartridge as replaceable units according to Embodiment 1 of the present invention.
Figure 3:
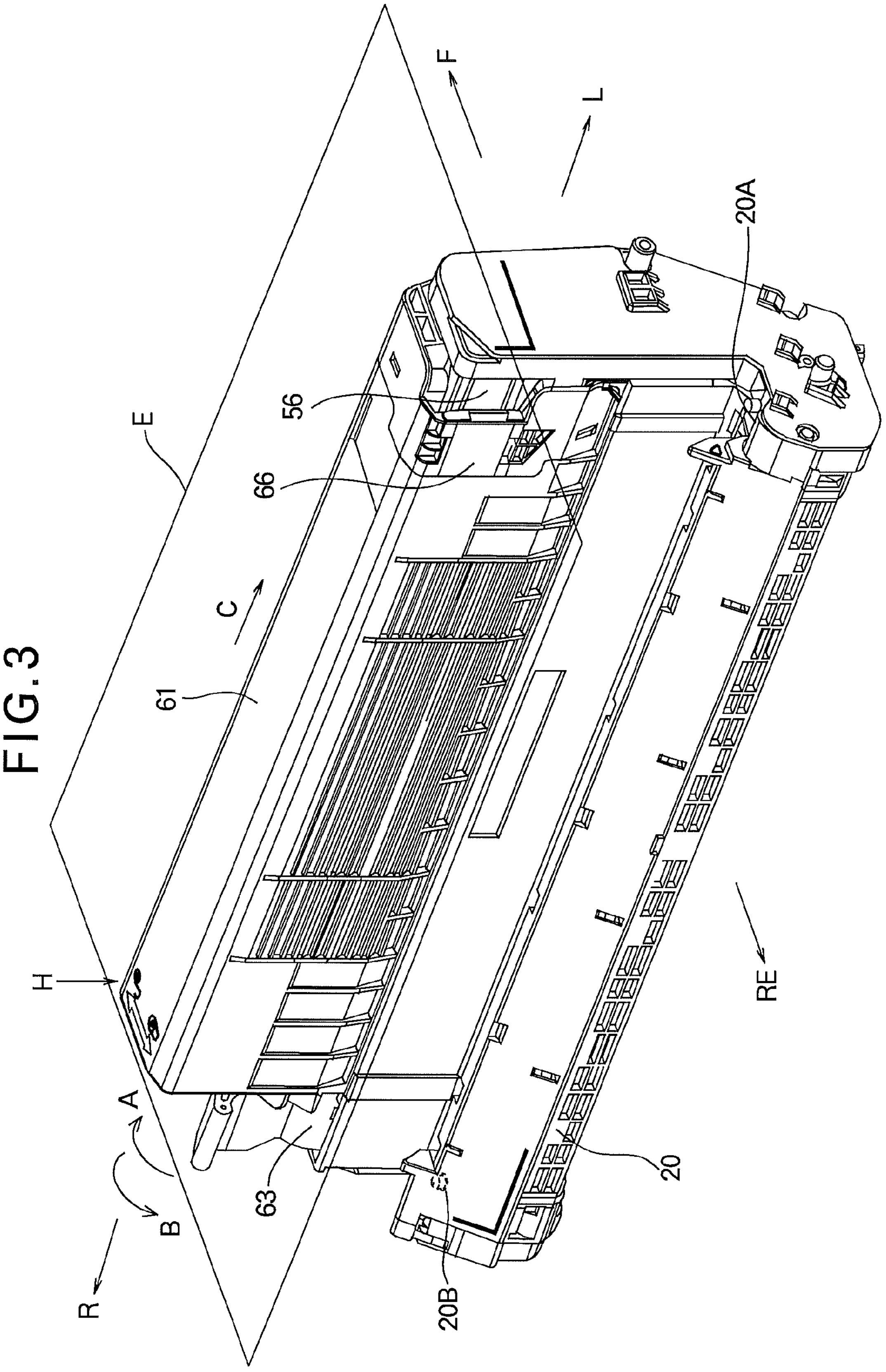
FIG. 3 is a perspective view showing the configurations of the developing unit and the toner cartridge according to Embodiment 1 of the present invention.
Figure 4:
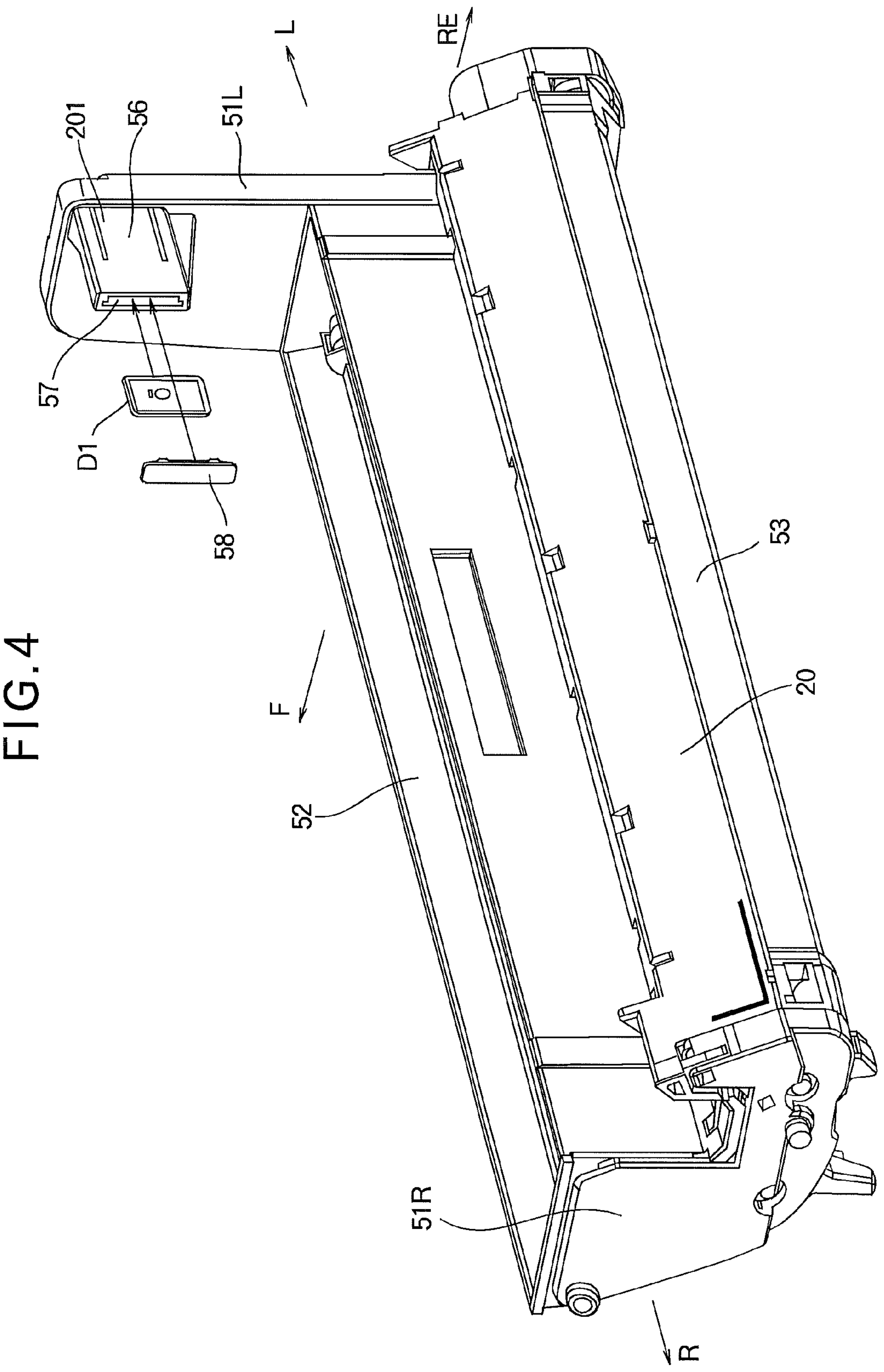
FIG. 4 is a perspective view showing the configuration the developing unit according to Embodiment 1 of the present invention.
Figure 5:
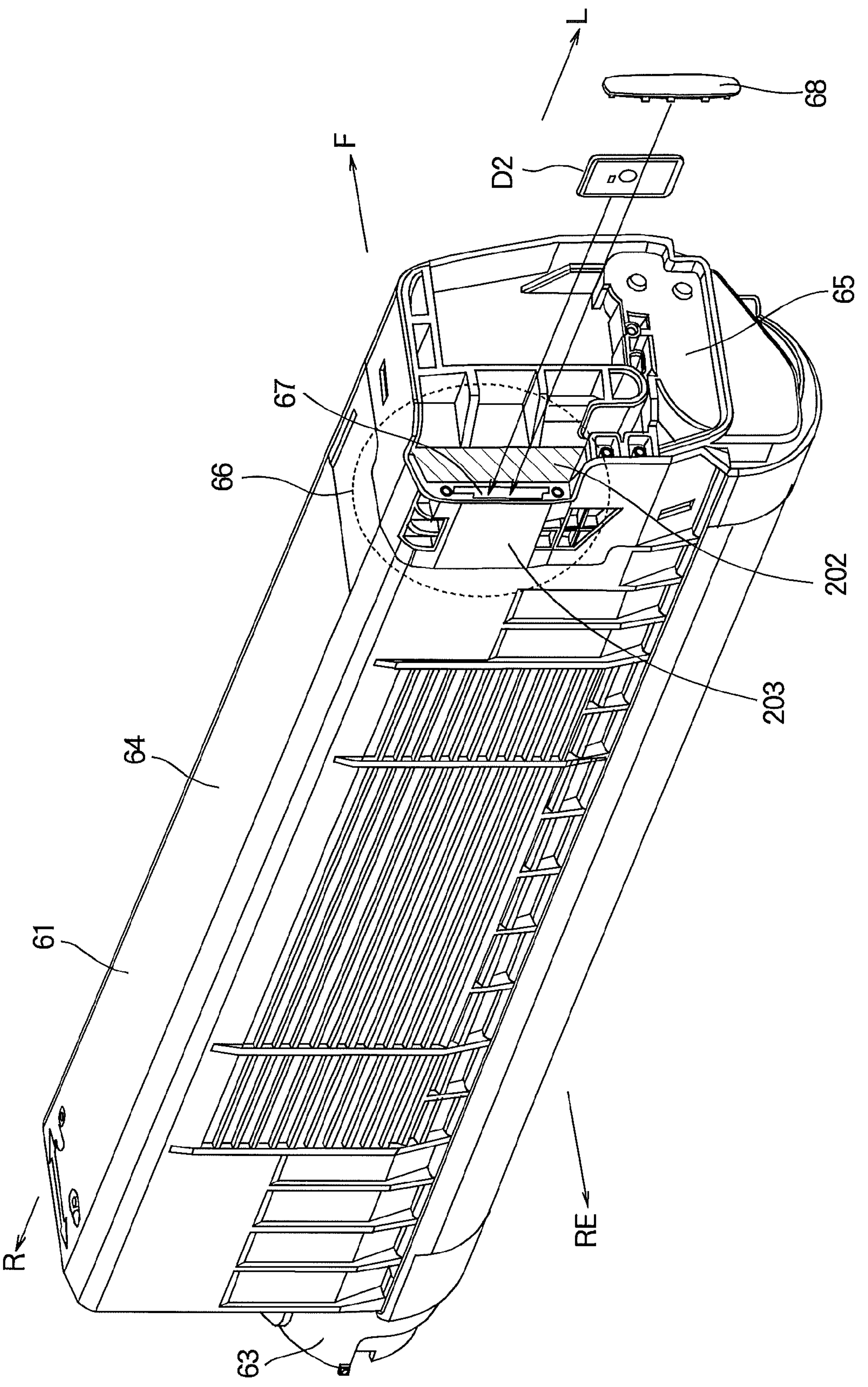
FIG. 5 is a perspective view showing the configuration of the toner cartridge according to Embodiment 1 of the present invention.

FIG. 2 is a sectional view showing the developing unit 20 as the first replaceable unit and the toner cartridge 61 as the second replaceable unit. FIG. 3 is a perspective view showing the developing unit 20 with the toner cartridge 61 being mounted. FIG. 4 is a perspective view showing the developing unit 20 with the toner cartridge 61 being detached therefrom. FIG. 5 is a perspective view showing the toner cartridge 61.

In FIGS. 2 through 5, an arrow "F" indicates a front side, and an arrow "RE" indicates a rear side. An arrow "L" indicates a left side, and an arrow "R" indicates a right side. Here, the front side (F) and the rear side (RE) respectively correspond to an upstream side and a downstream side along a direction in which the sheet passes the developing unit 2. The left side (L) and the right side (R) are determined based on the front side (F) and the rear side (RE).

The developing units 20K, 20Y, 20M and 20C have the same configurations except the toner as described above. Further, the toner cartridge 61K, 61Y, 61M and 61C (mounted to the developing units 20*k*, 20Y, 20M and 20C) have the same configurations except the toner stored therein.

As shown in FIG. 2, the developing unit 20 includes the photosensitive drum 21, a charging roller 22, a developing roller 23, a toner supplying roller 24, a developing blade 25, a cleaning blade 26, a toner storage chamber 27, and an agitating bar 28.

The photosensitive drum 21 (i.e., an image bearing body) is configured to bear a latent image and a toner image as a developer image. The charging roller 22 (i.e., a charging member) is provided in contact with the photosensitive drum 21, and is configured to uniformly charge the surface of the photosensitive drum 21.

The developing roller 23 (i.e., a developer bearing body) is provided in contact with the photosensitive drum 21, and bears a toner to be supplied to the photosensitive drum 21. The developing roller 23 rotates, and supplies the toner to the photosensitive drum 21. That is, the developing roller 23 causes the toner to adhere to the surface of the photosensitive drum 21 so as to develop the latent image on the photosensitive drum 21.

The toner supplying roller 24 (i.e., a developer supplying roller) is provided in contact with the developing roller 23, and is configured to supply the toner to the developing roller 23. The developing blade 25 (i.e., a developer regulating member) is provided so that an end of the developing blade 25 contacts the developing roller 23. The developing blade 25 regulates a thickness of a toner layer on the surface of the developing roller 23.

The cleaning blade 26 (i.e., a developer removing member) is configured to remove the residual toner remaining on the surface of the photosensitive drum 21 after the transferring of the toner image. The toner storage chamber 27 (i.e., a developer storage chamber) is configured to temporarily store the toner to be supplied to the developing roller 23. The agitating bar 28 (i.e., an agitating member) is configured to agitate the toner in the toner storage chamber 27.

The toner cartridge 61 as a replaceable unit is detachably mounted to the developing unit 20. The toner cartridge 61 (i.e., a developer storage container) is configured to store the toner. The developing unit 20 and the toner cartridge 61 have elongated shapes whose longitudinal directions are parallel with each other as shown in FIG. 3.

The toner cartridge 61 has a toner supplying opening at a bottom portion thereof. The toner supplying opening 62 (i.e., a developer supplying opening) is provided for supplying the toner stored in the toner cartridge 61 to the toner storage chamber 27. The toner supplying opening 62 is closed by a shutter 63 as an opening-and-closing member.

The toner cartridge 61 is fixed to the developing unit 20 by means of a not shown lock mechanism. The lock mechanism is linked with the shutter 63. The lock mechanism locks the toner cartridge 61 or releases the lock on the toner cartridge 61 depending on a position of the shutter 63.

For example, when the toner in the toner cartridge 61 is used up (i.e., when the toner cartridge 61 becomes empty), a user replaces the toner cartridge 61 with a new toner cartridge. To be more specific, the user rotates the shutter 63 in a direction shown by an arrow A in FIG. 3. As the shutter 63 rotates in the direction shown by the arrow A, the lock mechanism releases the lock on the toner cartridge 61, and the toner cartridge 61 becomes detachable. FIG. 3 is illustrated in such a manner that the developing unit 21 and the toner cartridge 61 are viewed from rear side.

When the lock mechanism releases the lock on the toner cartridge 61, the user detaches the toner cartridge from the developing unit 20, and mounts new toner cartridge 61 to the developing unit 20 by sliding the toner cartridge 61 in a direction shown by an arrow C in FIG. 3.

After the toner cartridge 61 is mounted to the developing unit 20, the user rotates the shutter 63 in the direction shown by the arrow B. With the rotation of the shutter 63 in the direction shown by the arrow B, the lock mechanism locks the toner cartridge 61 with respect to the developing unit 20. The toner stored in the new toner cartridge 61 falls on the toner storage chamber 27 via the toner supplying opening 62, and is stored in the toner storage chamber 27. In this way, replacement of the toner cartridge 61 is completed.

As shown in FIG. 1, the LED head 10 is disposed between the charging roller 22 and the developing roller 23 so as to face the photosensitive drum 21. Further, the transfer roller 31 is disposed between the developing roller 23 and the cleaning blade 26 so as to face the photosensitive drum 21 via the conveying belt 5.

As shown in FIG. 4, a casing of the developing unit 20 is constituted by side plates 51R and 51L, an upper frame 52 and a base frame 53. The side plates 51R and 51L define side surfaces of the developing unit 20. Further, the side plates 51R and 51L support both ends of the respective components of the developing unit 20 (i.e., the photosensitive drum 21, the charging roller 22, the developing roller 23, the toner supplying roller 24 and the developing roller 25). The upper frame 52 and the base frame 53 define front, rear, upper and lower surfaces of the developing unit 20. The toner cartridge 61 is mounted on the upper frame 52.

A first fitting portion 56 (FIGS. 3 and 4) is provided on an inner side surface of the side plate 51L. The first fitting portion 56 engages a second fitting portion 66 provided on the toner cartridge 61 (FIGS. 3 and 4). The first fitting portion 56 is also referred to as a first unit fitting portion, and the second fitting portion 66 is also referred to as a second unit fitting portion.

The first fitting portion 56 protrudes from the inner side surface of the side plate 51L, and is inserted into the toner cartridge 61. The first fitting portion 56 includes a convex portion 201 that protrudes from the side plate 51L, a tag mounting portion 57 formed in the convex portion 201, a first RFID (Radio Frequency Identification Device) tag D1 mounted in the tag mounting portion 57, and a first lid 58 covering the tag mounting portion 57. In this regard, the term "RFID tag" is used to mean a storage unit having an antenna coil and allowing writing and reading of information using wireless communication with an external image processing apparatus (here, a printer as an image forming apparatus). Here, the FRID tag is used as a data carrier mounted to the toner cartridge 61 as the replaceable unit. The tag mounting portion 57 is also referred to as a first tag mounting portion 57 in order to make distinction from a second tag mounting portion 67 (FIGS. 5 and 6) described later.

The tag mounting portion 57 is provided in the first fitting portion 56. The tag mounting portion 57 is a space in which the first RFID tag D1 is mounted. The first RFID tag D1 (i.e., a storage unit) is so configured that information stored therein can be read using wireless communication. The first RFID tag D1 (i.e., a first data carrier) stores management information regarding the developing unit 20, and is also referred to as a first storage unit.

One first RFID tag D1 is mounted in each of the first fitting portions 56K, 56Y, 56M and 56C of the developing units 20K, 20Y, 20M and 20C. The first RFID tags D1K, D1Y, D1M and D1C mounted in the first fitting portions 56K, 56Y, 56M and 56C have the same configuration except information stored therein.

The first fitting portion 56 has the first lid 58 covering the tag mounting portion 57 for preventing the first RFID tag D1 from dropping out of the tag mounting portion 57.

As shown in FIG. 5, a casing of the toner cartridge 61 is constituted by an outer frame 64 as a first casing portion and a side frame 65 as a second casing portion. The outer frame 64 defines front, rear, upper and lower surfaces of the toner cartridge 61. The outer frame 64 has a toner supplying opening 62 (FIG. 2) at a bottom portion thereof. The bottom portion of the outer frame 64 contacts the upper frame 52 (FIG. 4) of the developing unit 20. The shutter 63 is provided in the outer frame 64 so that a part of the shutter 63 (to be gripped by the user) protrudes outside. The side frame 65 defines a side surface of the toner cartridge 61.

The second fitting portion 66 (FIGS. 3 and 5) are provided on an outer side surface of the side frame 65. The second fitting portion 66 engages the first fitting portion 56 (FIGS. 3 and 4) of the developing unit 20. The second fitting portion 66 includes a concave portion 202 formed on the side frame 65, a second tag mounting portion 67 formed in a wall 203 of the concave portion 202, a second RFID tag D2 mounted in the second tag mounting portion 67 and a lid 28 covering the second tag mounting portion 67. The concave portion 202 of the second fitting portion 66 is a space into which the first fitting portion 56 is inserted. The concave portion 202 extends in the longitudinal direction of the developing unit 20.

The second tag mounting portion 67 is provided in the second fitting portion 66. The tag mounting portion 67 is a space in which the second RFID tag D2 is mounted. The second RFID tag D2 (i.e., a storage unit) is so configured that information stored therein can be read using wireless communication. The second RFID tag D2 (i.e., a second data carrier) stores management information regarding the toner cartridge 61, and is also referred to as a second storage unit.

One second RFID tag D2 is mounted in each of the second fitting portions 66K, 66Y, 66M and 66C of the toner cartridges 61K, 61Y, 61M and 61C. The second RFID tags D2K, D2Y, D2M and D2C mounted in the second fitting portions 66K, 66Y, 66M and 66C have the same configuration except information stored therein.

The second fitting portion 66 has the second lid 68 covering the tag mounting portion 67 for preventing the second RFID tag D2 from dropping out of the tag mounting portion 67.

<Positional Relationship Between Fitting Portions>

In Embodiment 1, the printer 1 has the four first RFID tags D1 and the four second RFID tags D2, and is configured to read information from these RFID tags D1 and D2 using the four communication antennas 83. Since the four communication antennas 83 use electromagnetic waves whose phases are close to each other, interference may occur between communications using the communication antennas 83. For this reason, it is necessary to precisely position the four first RFID tags D1, the four second RFID tags D2 and the four communication antennas 83. In Embodiment 1, the first fitting portions 56 and the second fitting portions 66 have a function to precisely position the first RFID tags D1 and the second RFID tags D2 with respect to the communication antennas 83.

Figure 6:
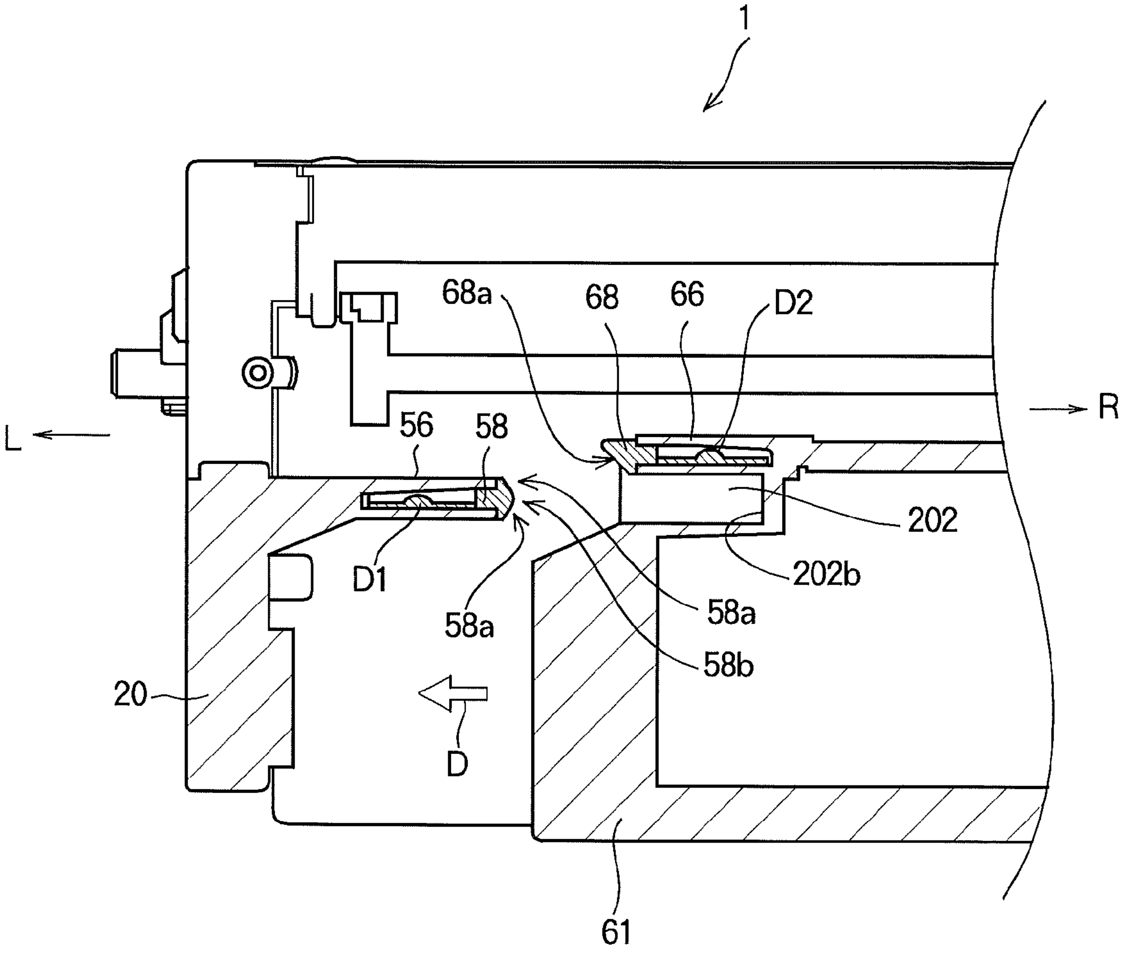
FIG. 6 is an enlarged sectional view showing configurations of parts of the developing unit and the toner cartridge according to Embodiment 1 of the present invention.

A positional relationship between the first fitting portions 56 and the second fitting portions 66 when mounting the toner cartridge 61 to the developing unit 20 will be described with reference to FIG. 6. FIG. 6 is a sectional view showing parts of the first fitting portion 56 of the developing unit 20 (i.e., the first replaceable unit) and the second fitting portion 66 of the toner cartridge 61 (i.e., the second replaceable unit) as seen in a direction shown by an arrow H in FIGS. 1 and 3. To be more specific, FIG. 6 shows a state immediately before the first fitting portion 56 of the developing unit 20 and the second fitting portion 66 of the toner cartridge 61 fit each other.

As shown in FIG. 6, an inclined surface 58*a* is formed on a tip of the first lid 58 of the first fitting portion 56 of the developing unit 20. An inclined surface 68*a* is formed on a tip of the second lid 68 of the second fitting portion 66 of the toner cartridge 61. The inclined surface 58*a* and the inclined surface 68*a* have a function to guide the first fitting portion 56 and the second fitting portion 66 to respective predetermined positions, so as to enhance operability in mounting the toner cartridge 61 to the developing unit 20. The inclined surface 58*a* and the inclined surface 68*a* are also referred to as inclined portions.

With the above configuration, when the toner cartridge 61 is mounted to the developing unit 20 in a direction shown by an arrow D in FIG. 6, a first positioning portion 58*b* formed on the first lid 58 and a second positioning portion 202*b* formed on the concave portion 202 abut against each other, so that the first fitting portion 56 and the second fitting portion 66 are positioned at respective predetermined positions. In this regard, the "predetermined positions" are positions such that an antenna coil 73*a* (described later) of the first RFID tag D1 and an antenna coil 73*b* (described later) of the second RFID tag D2 partially overlap each other (see FIG. 13B), and the antenna coils 73*a* and 73*b* are disposed in a communicable area of the communication antenna 83 and are substantially parallel with an antenna coil 93 (FIGS. 11 and 13B) of the communication antenna 83 (see FIG. 12A).

Here, as shown in FIG. 1, the upper cover 7 is provided on the printer 1 as the main body apparatus. The upper cover 7 is pivoted at a fulcrum O, and is swingable (openable) as shown by an arrow P. With the swinging of the upper cover 7, the holder portions 11 and the LED heads 10 (i.e., the exposure units) mounted to the upper cover 7 move toward and away from the developing unit 20.

Figure 7:
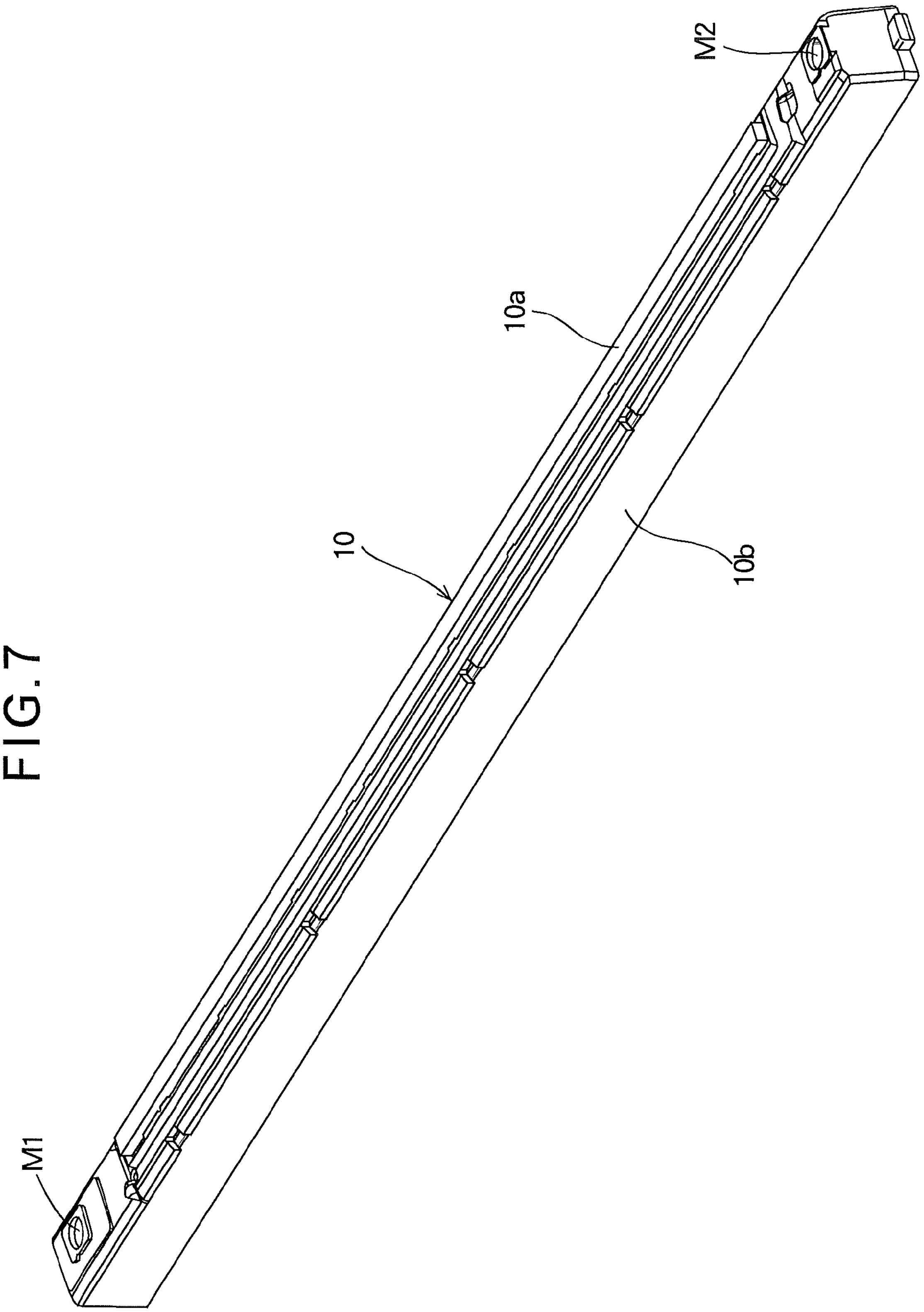
FIG. 7 is a perspective view showing a configuration of an exposure unit according to Embodiment 1 of the present invention.

FIG. 7 shows a configuration of a main part of the LED head 10 (i.e., the exposure unit) according to Embodiment 1. To be more specific, FIG. 7 is a perspective view showing the LED head 10 as seen from the transfer unit 30 side. As shown in FIG. 7, the LED head includes a lens unit 10*a*, LED elements (not shown) provided facing the lens unit 10*a*, and a holder portion 10*b* that support the lens unit 10*a* and the LED elements. The holder portion 10*b* has fourth positioning portions M1 and M2.

When the upper cover 7 of the printer 1 is in a closing position as shown in FIG. 1, third positioning portions 20A and 20B (FIG. 3) of the developing unit 20 engage the fourth positioning portions M1 and M2 (FIG. 7) of the LED head 10. With such an engagement, the communication antenna 83 on the holder portion 11 (provided on the upper cover 7) is positioned so as to face a portion where the first fitting portion 56 and the second fitting portion 66 fit each other. Therefore, a position of the communication antenna 83 is determined with respect to the first RFID tag D1 and the second RFID tag D2 in a direction (shown by an arrow X in FIG. 13B) in which the first RFID tag D1 and the second RFID tag D2 overlap each other.

The communication antenna 83 is in the form of a planar antenna with which the printer 1 performs wireless communication with the first RFID tag D1 and the second RFID tag D2. In Embodiment 1, the printer 1 is configured to perform wireless communication with the first RFID tag D1 and the second RFID tag D2 using one communication antenna 83. This contributes to reducing the number of communication antennas 83.

Therefore, one communication antenna 83 and two data carriers (i.e., the first RFID tag D1 and the second RFID tag D2) provided in the vicinity thereof constitute a single communication group. The printer 1 includes a plurality of such communication groups. The communication antennas 83 are configured to output weak electromagnetic waves so that no interference occurs between communications of the communication groups.

Figure 12A:
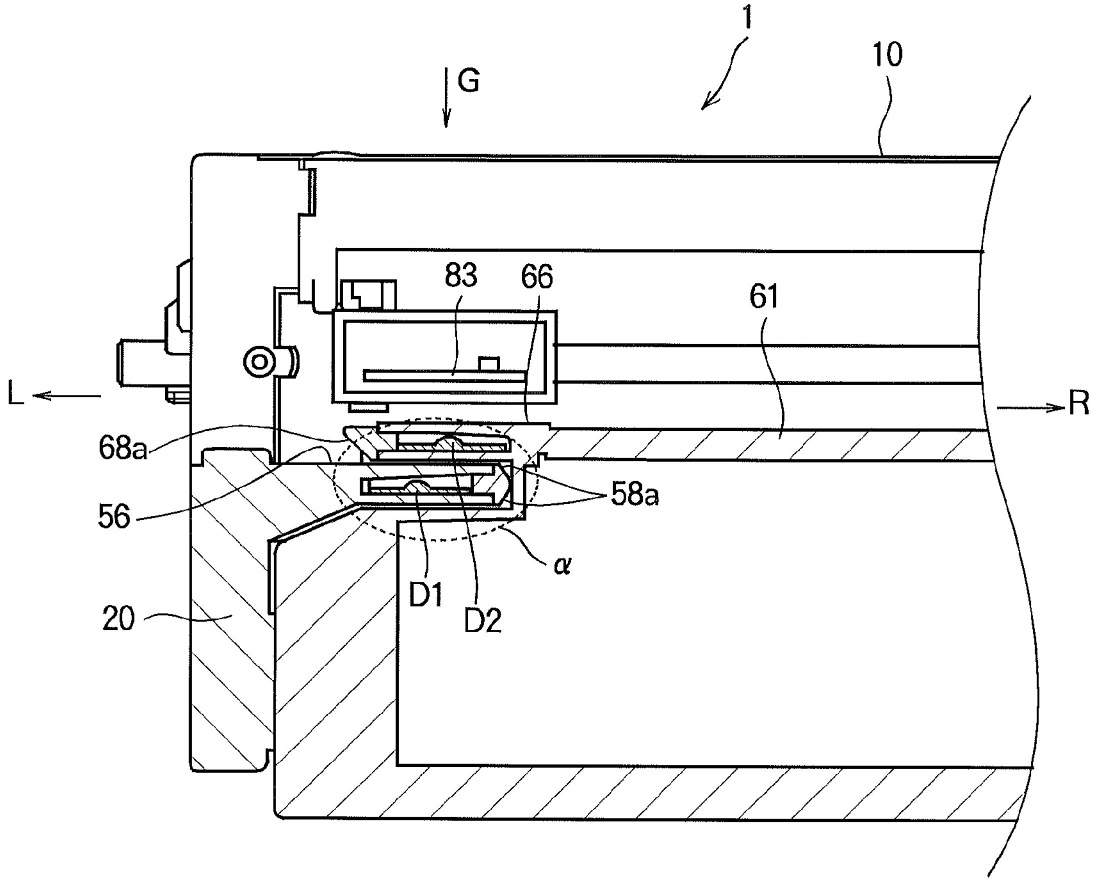
FIG. 12A is a schematic view showing a positional relationship between the communication antenna, the developing unit and the toner cartridge according to Embodiment 1 of the present invention.

For this reason, the communication antenna 83 is provided in the vicinity of the first RFID tag D1 and the second RFID tag D2, and is substantially parallel with the first RFID tag D1 and the second RFID tag D2 as shown in FIG. 12A. In Embodiment 1, the communication antenna 83 is mounted in the holder portion 11 (FIG. 1). The holder portion 11 is provided for mounting the LED head 10 to the upper cover 7. With such a structure, the communication antenna 83 is provided in the vicinity of (and in substantially parallel with) the first RFID tag D1 and the second RFID tag D2. The term "substantially parallel" means being predetermined angle (in this example, ±10 degrees) or less from being parallel.

However, even with such a structure, it is still necessary for the printer 1 to raise an output level of the communication antenna 83 or to enlarge a size (area) of the communication antenna 83 for ensuring communication with the first RFID tag D1 and the second RFID tag D2. Therefore, in the printer 1, the first fitting portion 56 and the second fitting portion 66 are disposed at the above described predetermined positions so as to position the communication antenna 83, the first RFID tag 56 and the second RFID tag 66 at suitable positions. With such an arrangement, it is ensured that the printer 1 can perform communication using weak electromagnetic waves. Therefore, it becomes unnecessary to raise the output level of the communication antenna 83 or to enlarge the size of the communication antenna 83. That is, it becomes possible to reduce the size of the antenna coil 93 of the communication antenna 83 as a reading unit. Hereinafter, the communication antenna 83, the first RFID tag D1 and the second RFID tag D2 will be described in detail.

<Configurations of Data Carriers>

Figure 8:
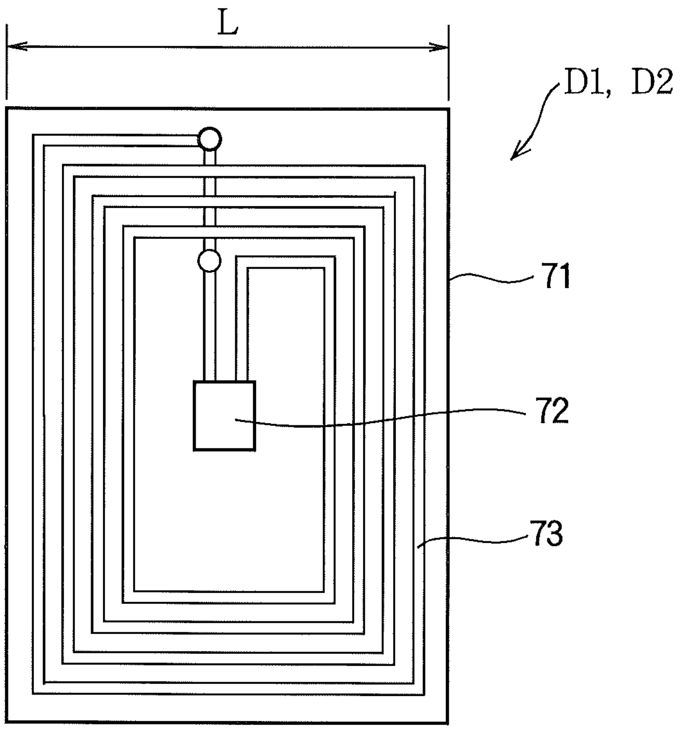
FIG. 8 is a plan view showing a configuration of a data carrier according to Embodiment 1 of the present invention.

First, configurations of the first RFID tag D1 (i.e., the first data carrier) and the second RFID tag D2 (i.e., the second data carrier) will be described with reference to FIG. 8. FIG. 8 shows a configuration of the data carrier which is common to the first RFID tag D1 and the second RFID tag D2. As shown in FIG. 8, the data carrier (the first RFID tag D1 and the second RFID tag D2) includes a substrate 71 having a rectangular shape, and further includes an IC (Integrated Circuit) chip 72 and an antenna coil 73 formed on the substrate 71.

The IC chip 72 obtains electric power from high-frequency power received by the antenna coil 73, performs various kinds of operations, and performs communication. The IC chip 72 (i.e., a memory member) is located at a substantial center of the substrate 71. The IC chip 72 has a memory element (not shown), and stores information regarding the developing unit 20 or the toner cartridge 61 in the memory element. In response to a command outputted from the printer 1, the IC chip 72 reads information stored in the memory element and outputs the information to the printer 1, or the IC chip 72 writes information into the memory element.

The antenna coil 73 is in the form of a planer antenna, and is used to receive high frequency electric power from the communication antenna 83 and to perform communication. The antenna coil 73 is formed of a conductive pattern and has a plane spiral shape extending outward (i.e., toward a periphery of the substrate 71) from the IC chip 72. The antenna coil 73 is also referred to an antenna of the data carrier.

<Examples of Information Stored in Data Carriers>

Figure 9A:
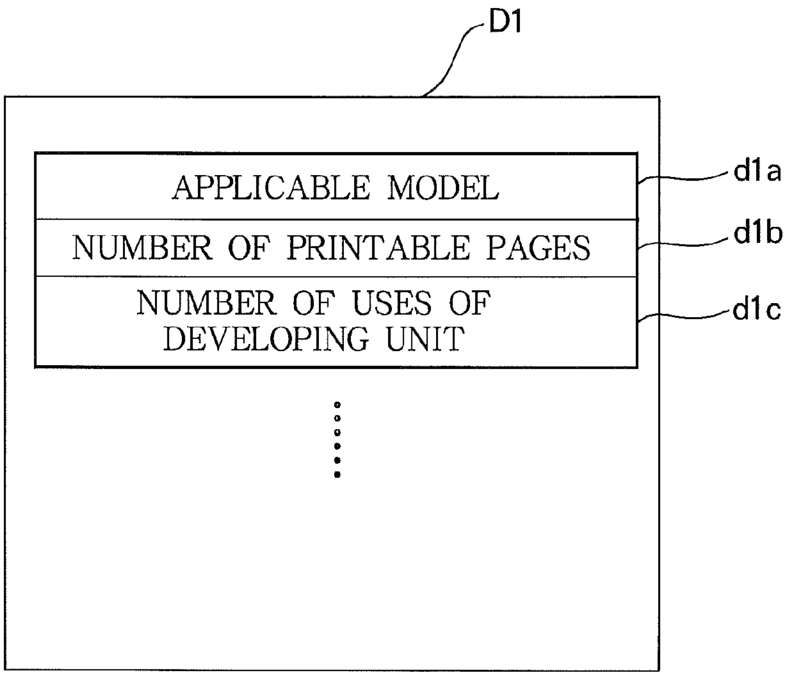
FIGS. 9A and 9B are schematic views showing examples of information stored in the data carrier according to Embodiment 1 of the present invention.
Figure 9B:
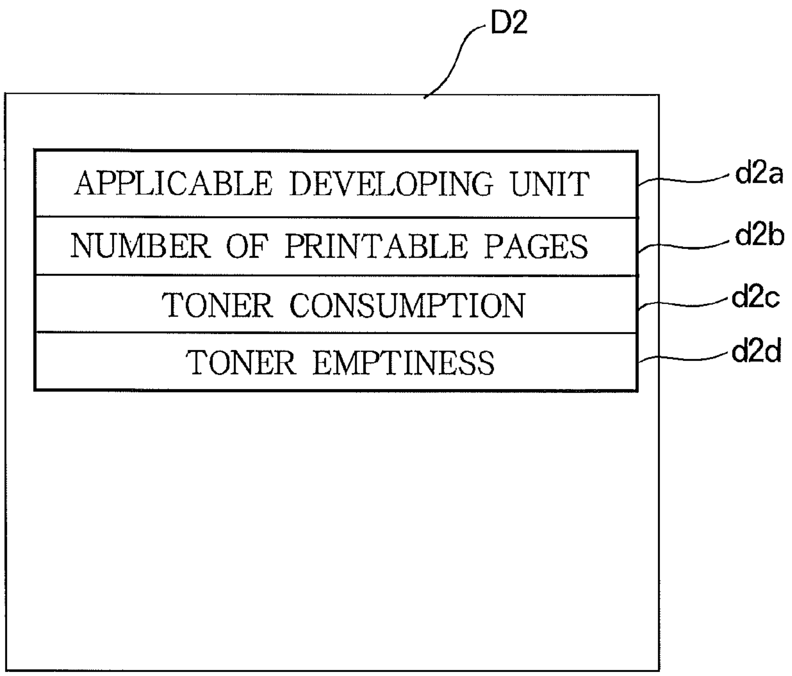

Next, examples of information stored in the first RFID tag D1 and the second RFID tag D2 will be described with reference to FIGS. 9A and 9B. FIG. 9A shows an example of information stored in the first RFID tag D1. FIG. 9B shows an example of information stored in the second RFID tag D2.

As shown in FIG. 9A, the first RFID tag D1 stores management information regarding the developing unit 20. To be more specific, the first RFID tag D1 stores information on an applicable model (d1*a*), the number of printable pages (d1*b*), and the number of uses of the developing unit 20 (d1*c*). An RF reading-and-writing control unit 81 (FIG. 1) of the printer 1 reads the information from the first RFID tag D1, and output the information to a printer control unit 82 (FIG. 1). The printer control unit 82 receives the information from the RF reading-and-writing control unit 81, and performs predetermined operations.

The information on the applicable model (d1*a*) indicates models of the printer 1 in which the developing unit 20 can be used. The printer control unit 82 of the printer 1 compares the information on the applicable model (d1*a*) stored in the first RFID tag D1 and a model of the printer 1 itself stored in a storage portion (not shown) of the printer 1. If the models are not the same as each other, the printer control unit 82 determines that an incorrect developing unit 20 is mounted to the printer 1. In this case, the printer control unit 82 causes a sound output unit (not shown) to generate an alarm sound, or causes a display unit (not shown) to display an alarm message so as to notify the user that an incorrect developing unit 20 is mounted to the printer 1.

The information on the number of printable pages (d1*b*) indicates the number of pages on which the developing unit 20 can still perform printing. The printer control unit 82 of the printer 1 specifies the number of printable pages based on the information on the number of printable pages (d1*b*), and decrements the number of printable pages by one at every printing operation. Further, the printer control unit 82 causes the RF reading-and-writing control unit 81 to update the information on the number of printable pages (d1*b*) stored in the first RFID tag D1 with the decremented number. In this way, the printer control unit 82 manages the number of pages on which the developing unit 20 can still perform printing. In this regard, the information on the number of printable pages (d1*b*) is determined under the assumption that printing will be performed on the sheets of A4-size at a printing density of 5%. For this reason, if the printer 1 performs printing on the sheets of a size other than A4-size, the printer control unit 82 manages the number of printable pages by converting the size of the printed pages (sheets) into A4-size.

The information on the number of uses of the developing unit 20 (d1*c*) indicates the number of pages on which the developing unit 20 has performed printing (i.e., the number of printed pages). The number of printed pages is calculated by converting the size of the printed pages (sheets) into A4-size. The printer control unit 82 of the printer 1 specifies the number of printed pages (on which the developing unit 20 has performed printing) based on the information on the number of uses of the developing unit 20 (d1*c*), and increments the number of printed pages by one at every printing operation. Further, the printer control unit 82 causes the RF reading-and-writing control unit 81 to update the information on the number of uses of the developing unit 20 (d1*c*) stored in the first RFID tag D1 with the incremented number. In this way, the printer control unit 82 manages the number of uses of the developing unit 20 (i.e., the number of pages on which the developing unit 20 has performed printing).

As shown in FIG. 9B, the second RFID tag D2 stores management information regarding the toner cartridge 61. To be more specific, the second RFID tag D2 stores information on an applicable developing unit (d2*a*), the number of printable pages (d2*b*), toner consumption (d2*c*), and toner emptiness (d2*d*). The RF reading-and-writing control unit 81 of the printer 1 reads the information from the second RFID tag D2 in a similar as when the RF reading-and-writing control unit 81 reads information from the first RFID tag D1, and output the information to the printer control unit 82. The printer control unit 82 receives the information from the RF reading-and-writing control unit 81, and performs predetermined operations.

The information on the applicable developing unit (d2*a*) indicates models of the developing unit 20 in which the toner cartridge 61 can be used. The printer control unit 82 of the printer 1 compares the information on the applicable developing unit (d2*a*) stored in the second RFID tag D2 and a model of the developing unit 20 stored in a storage portion (not shown) of the printer 1. If the models are not the same as each other, the printer control unit 82 determines that an incorrect toner cartridge 61 is mounted to the developing unit 20. In this case, the printer control unit 82 causes the sound output unit to generate an alarm sound, or causes the display unit to display an alarm message so as to notify the user that an incorrect toner cartridge 61 is mounted to the developing unit 20.

The information on the number of printable pages (d2*b*) indicates the number of pages on which printing can still be performed using the toner stored in the toner cartridge 61. The printer control unit 82 of the printer specifies the number of printable pages based on the information on the number of the printable pages (d2*b*), and decrements the number of printable pages by one at every printing operation. Further, the printer control unit 82 causes the RF reading-and-writing control unit 81 to update the information on the number of printable pages (d2*b*) stored in the second RFID tag D2 with the decremented number. In this way, the printer control unit 82 manages the number of pages on which printing can still be performed using the toner stored in the toner cartridge 61. In this regard, the information on the number of printable pages (d2*b*) is determined under the assumption that printing will be performed on the sheets of A4-size at a printing density of 5%. For this reason, if the printer 1 performs printing on the sheets of a size other than A4-size, the printer control unit 82 manages the number of printable pages by converting the size of the printed pages (sheets) into A4-size.

The information on the toner consumption (d2*c*) indicates an amount of the toner which has been consumed from the toner cartridge 61 (referred to as a toner consumption amount). The printer control unit 82 of the printer 1 specifies the toner consumption amount based on the information on the toner consumption (d2*c*). At every printing operation, the printer control unit 82 adds an amount of the toner consumed by the new printing operation to the toner consumption amount. Further, the printer control unit 82 causes the RF reading-and-writing unit 81 to update the toner consumption amount stored in the second RFID tag D2 with the toner consumption amount added as described above. Moreover, the printer control unit 82 subtracts the toner consumption amount from the capacity of the toner cartridge 61, and specifies a remaining amount of the toner in the toner cartridge 61. In this way, the printer control unit 82 manages the remaining amount of the toner in the toner cartridge 61. If the remaining amount of the toner in the toner cartridge 61 is less than a predetermined amount, the printer control unit 82 causes the sound output unit (not shown) to generate an alarm sound, or causes the display unit (not shown) to generate an alarm message so as to notify the user that toner replenishment is necessary.

The information on the toner emptiness (d2*d*) indicates that the toner cartridge 61 is empty (i.e., the toner in the toner cartridge 61 is used up) and the accumulated number of times the toner cartridge 61 becomes empty. For example, when the toner cartridge 61 becomes empty, the printer control unit 82 of the printer 1 determines how many times the toner cartridge 61 is reused (recycled) based on the information on the toner emptiness (d2*d*), and determines whether it is possible to further reuse the toner cartridge 61. The printer control unit 82 increments the accumulated number of times the toner cartridge 61 becomes empty, and causes the RF reading-and-writing unit 82 to update the information on the toner emptiness (d2*d*) with the incremented accumulated number. In this way, the printer control unit 82 manages a usage of the toner cartridge 61 based on the information on the toner emptiness (d2*d*).

<Configuration of Communication System>

Figure 10:
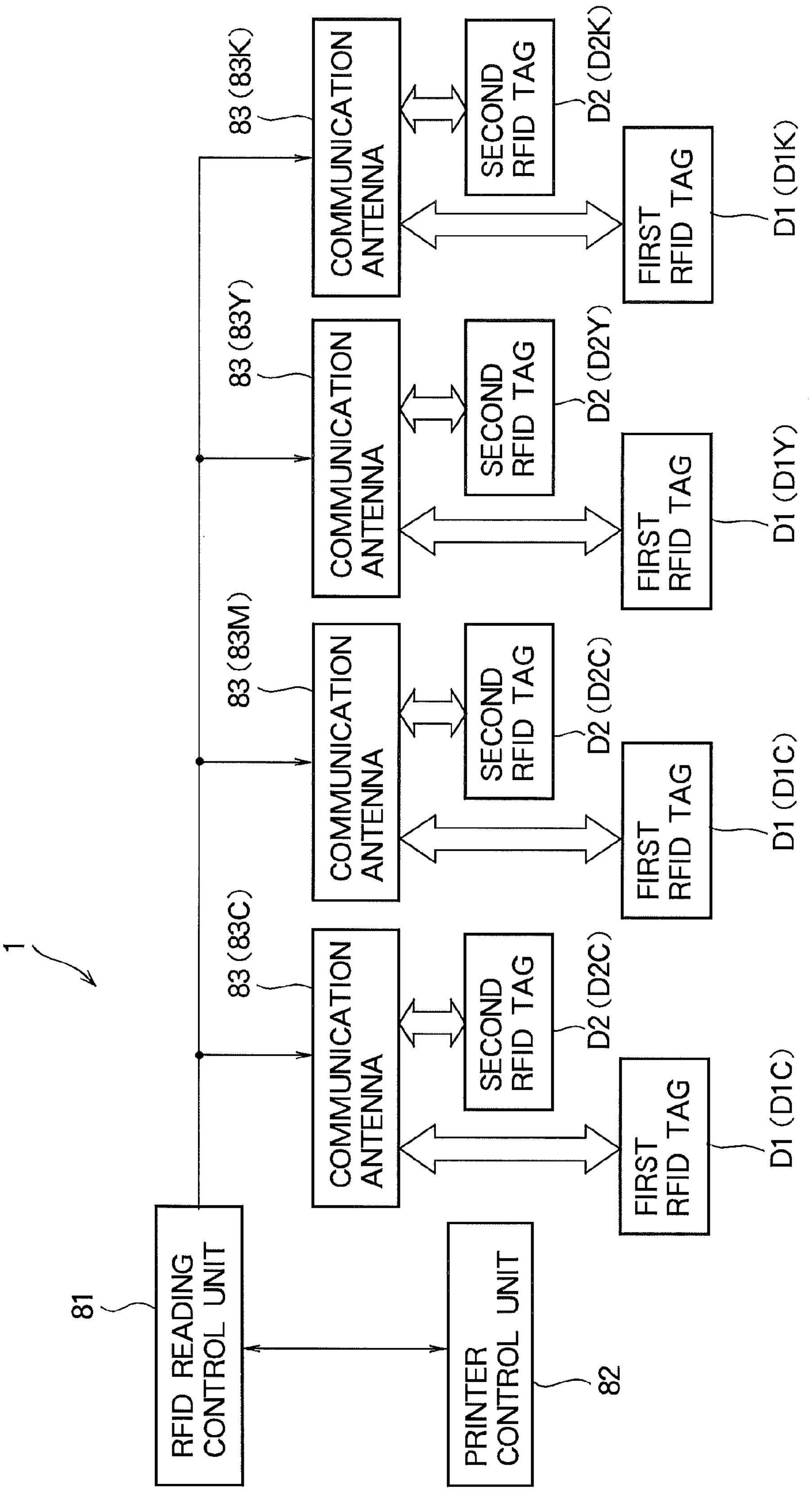
FIG. 10 is a block diagram showing a configuration of a communication system of the image forming apparatus according to Embodiment 1 of the present invention.

Next, a configuration of a communication system of the printer 1 will be described with reference to FIG. 10. FIG. 10 is a block diagram showing a configuration of the communication system of the printer 1 according to Embodiment 1. As shown in FIG. 10, the printer 1 includes the RF reading-and-writing unit 81 and the printer control unit 82.

The RF reading-and-writing unit 81 has a function to supply high-frequency electric power to the first RFID tags D1 and the second RFID tags D2 via the communication antennas 83, and to perform wireless communication with the first RFID tags D1 and the second RFID tags D2. The RF reading-and-writing unit 81 is connected to the communication antennas 83K, 83Y, 83M and 83C and the printer control unit 82 via signal lines. The communication antennas 83K, 83Y, 83M and 83C are respectively mounted in the holder portions 11K, 11Y, 11M and 11C (FIG. 1) provided for fixing the LED heads 10K, 10Y, 10M and 100 corresponding to the developing unit 20K, 20Y, 20M and 20C. The RF reading-and-writing unit 81 receives control signal from the printer control unit 82 via a signal line, and is supplied with electric power from the printer control unit 82. The RF reading-and-writing unit 81 performs communication (for example, reading or writing of information) with the first RFID tags D1 and the second RFID tags D2 via the communication antennas 83 to thereby send information to and receive information from the printer control unit 82.

The printer control unit 82 has a function to control an operation of the printer 1. The printer control unit 82 performs communication with the first RFID tags D1 and the second RFID tags D2 via the RF reading-and-writing unit 81 to thereby perform predetermined operations. The printer control unit 82 is also referred to as an information processing unit.

<Configuration of Communication Antenna>

Figure 11:
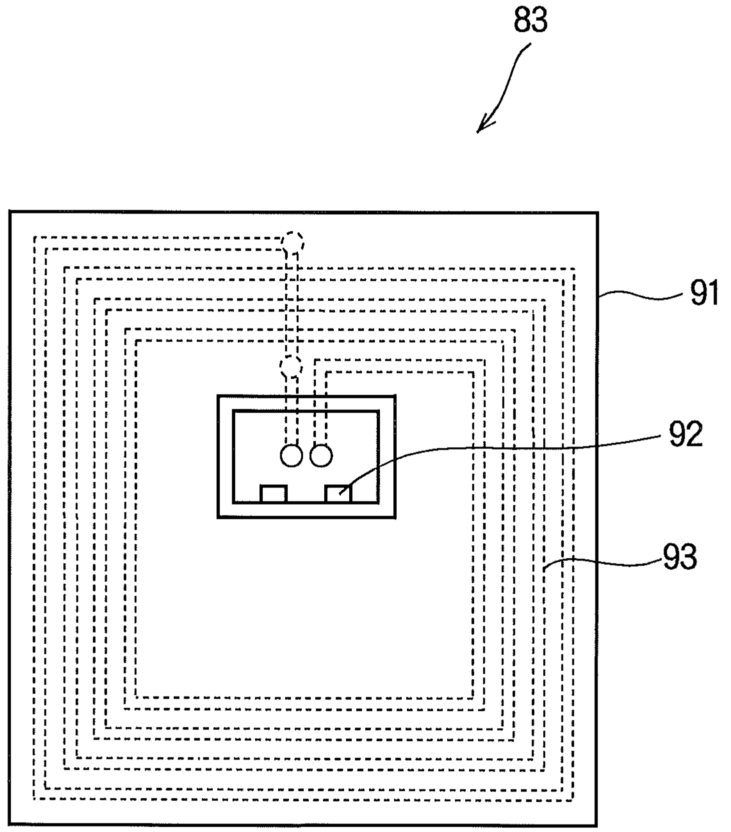
FIG. 11 is a plan view showing a configuration of a communication antenna of the image forming apparatus according to Embodiment 1 of the present invention.

Next, a configuration of the communication antenna 83 of the printer 1 will be described with reference to FIG. 11. FIG. 11 shows a configuration of the communication antenna 83 of the printer 1 according to Embodiment 1. As shown in FIG. 11, the communication antenna 83 includes a substrate 91 having a rectangular shape, and further includes an interface (I/F) connector 92 and an antenna coil 93 provided on the substrate 91.

The interface connector 92 is a connector to which a coaxial cable from the RF reading-and-writing unit 81 is connected. The interface connector 92 is provided at a substantial center of the substrate 91, and is connected to the antenna coil 93.

The antenna coil 93 (i.e., a receiving portion) is provided for supplying high frequency electric power to the first RFID tag D1 and the second RFID tag D2, and performing wireless communication with the first RFID tag D1 and the second RFID tag D2. The antenna coil 93 is formed of a conductive pattern and has a plane spiral shape extending outward (i.e., toward a periphery of the substrate 91) from the interface connector 92.

<Positions of Communication Antenna and Data Carrier>

Next, a positional relationship between the communication antenna 83, the first RFID tag D1 and the second RFID tag D2 will be described with reference to FIG. 12A. FIG. 12A is a sectional view showing a positional relationship between the communication antenna 83, the first RFID tag D1 and the second RFID tag D2 (i.e., the data carriers) mounted to the developing unit 20 and the toner cartridge 61 (i.e., the replaceable units). To be more specific, FIG. 12A shows a state where the first fitting portion 56 of the developing unit 20 and the second fitting portion 66 of the toner cartridge 61 fit each other, as seen in the direction shown by the arrow H in FIGS. 1 and 3.

As shown in FIG. 12A, the first fitting portion 56 of the developing unit 20 and the second fitting portion 66 of the toner cartridge 61 fit each other at an area in the vicinity of the communication antenna 83 in such a manner that the first fitting portion 56 and the second fitting portion 66 face the communication antenna 83. The area where the first fitting portion 56 and the second fitting portion 66 fit each other is referred to as a unit fitting area α.

In this state, the first RFID tag D1 and the second RFID tag D2 face the communication antenna 83. To be more specific, the antenna coils 73 (FIG. 8) of the first RFID tag D1 and the second RFID tag D2 are located in a communicable area of the communication antenna 83, and are disposed substantially parallel with the antenna coil 93 (FIG. 11) of the communication antenna 83. The term "substantially parallel" means being predetermined angle (in this example, ±10 degrees) or less from being parallel.

Figure 12B:
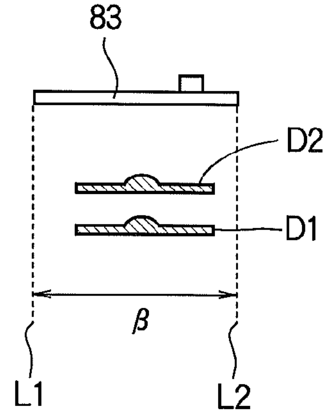
FIGS. 12B and 12C are schematic views for illustrating a positional relationship between the communication antenna and the data carriers according to Embodiment 1 of the present invention.

Here, the expression that "the first RFID tag D1 and the second RFID tag D2 face the communication antenna 83" is used to mean that the first RFID tag D1 and the second RFID tag D2 are disposed in a position between ends (peripheries) of the communication antenna 83 as shown by an arrow β between lines L1 and L2 in FIG. 12B.

Figure 12C:
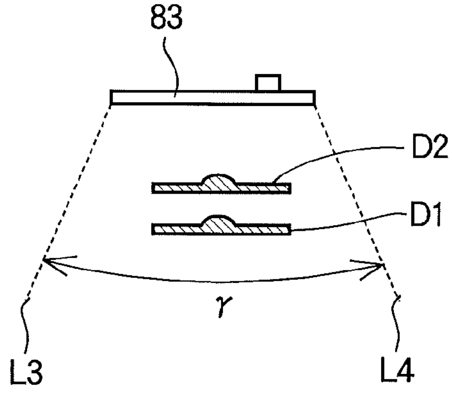

However, if a communicable area of the communication antenna 83 is a widening area y as shown by lines L3 and L4 in FIG. 12C, it is also possible that the first RFID tag D1 and the second RFID tag D2 are disposed in the widening area.

<Size of Communication Antenna Relative to Data Carrier>

Figure 13A:
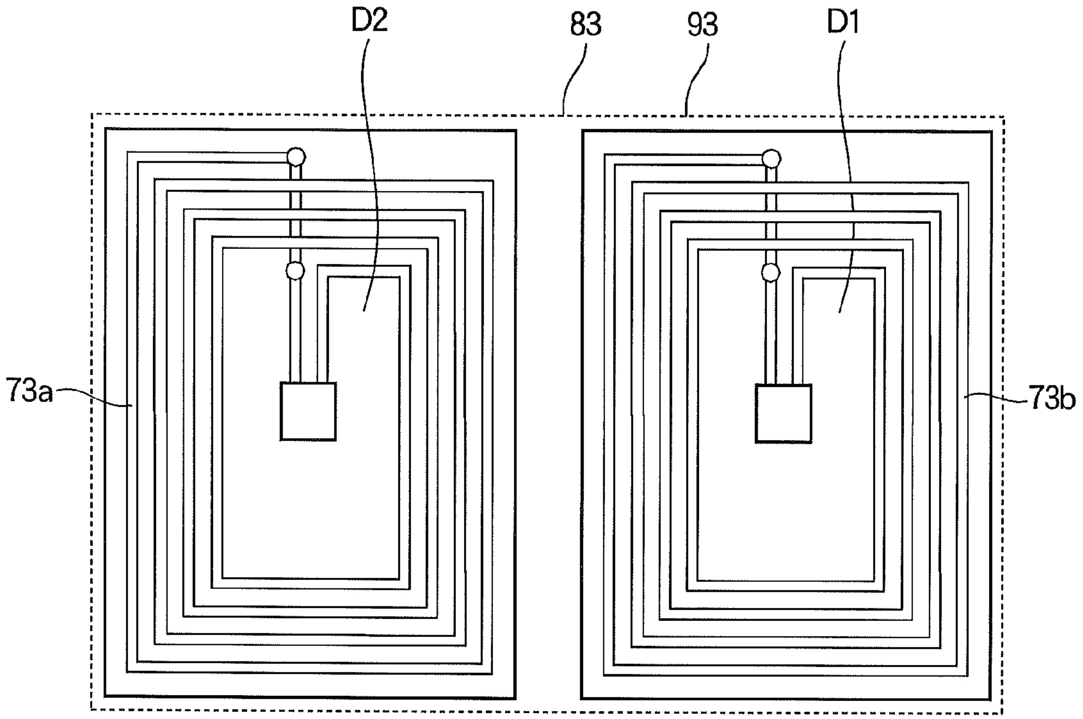
FIGS. 13A and 13B are schematic views showing a relationship between the communication antenna and the data carriers according to Embodiment 1 of the present invention.
Figure 13B:
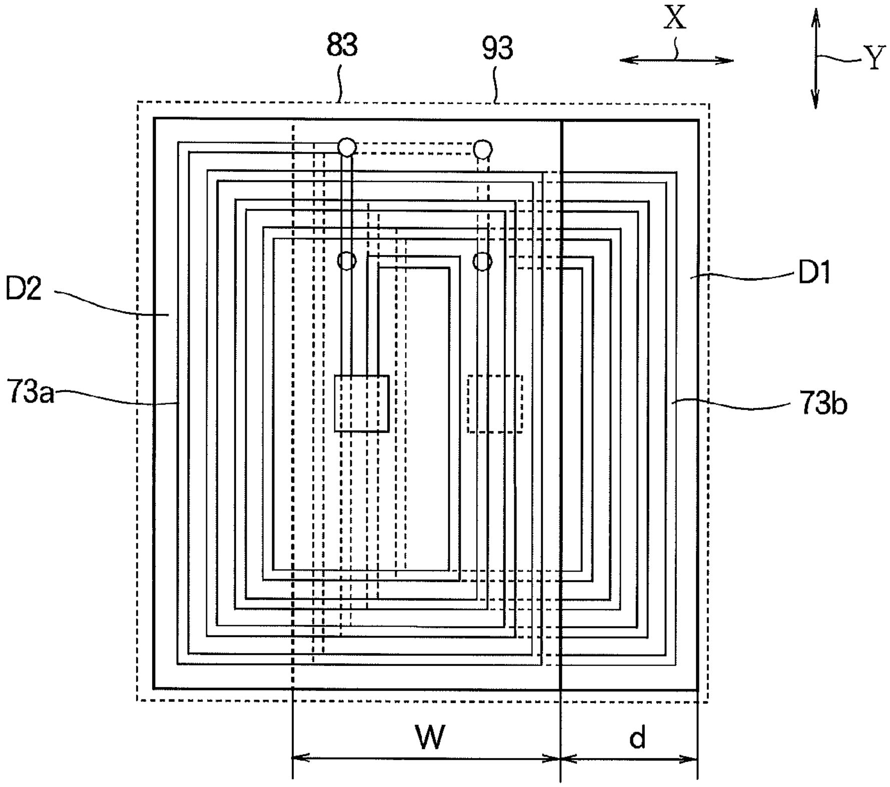

Next, a size of the communication antenna 83 relative to the first RFID tag D1 and the second RFID tag D2 will be described with reference to FIGS. 13A and 13B. FIGS. 13A and 13B show a size of the communication antenna 83 relative to the first RFID tag D1 and the second RFID tag D2 (i.e., the data carriers) mounted to the developing unit 20 and the toner cartridge 61 (i.e., the replaceable units) according to Embodiment 1. FIGS. 13A and 13B show the first RFID tag D1, the second RFID tag D2 and the communication antenna 83 as seen a direction shown by an arrow G in FIG. 12A.

The antenna coil 93 of the communication antenna 83 necessarily has a size (area) such that the antenna coil 93 covers both of the antenna coil 73*a* of the first RFID tag D1 and the antenna coil 73*b* of the second RFID tag D2. If the antenna coil 73*a* and the antenna coil 73*b* are disposed so as not to overlap each other as seen from the communication antenna 83 side as shown in FIG. 13A, the antenna coil 93 necessarily has a very large size. However, the antenna coil 93 of the communication antenna 83 is preferably as small as possible so as to reduce a package density of the communication antenna 83.

For this reason, in Embodiment 1, the antenna coil 73*a* (i.e., a first antenna unit) and the antenna coil 73*b* (i.e., a second antenna unit) are disposed so as to overlap each other as seen from the communication antenna 83 side as shown in FIG. 13B. In other words, the first RFID tag D1 as the first storage unit and the second RFID tag D2 as the second storage unit overlap each other as seen from the communication antenna 83 side.

However, if the antenna coil 73*a* and the antenna coil 73*b* completely overlap each other, a communication failure may occur at the communication antenna 83. Therefore, the first RFID tag D1 and the second RFID tag D2 are disposed at positions mutually shifted in a horizontal direction (X direction), a vertical direction (Y direction) or an oblique direction so that the antenna coil 73*a* and the antenna coil 73*b* partially (not completely) overlap each other. That is, the first RFID tag D1 and the second RFID tag D2 are disposed so that the antenna coil 73*a* and the antenna coil 73*b* partially overlap each other. Further, the first RFID tag D1 and the second RFID tag D2 are disposed in the communicable area of the communication antenna 83, and are disposed substantially parallel with the antenna coil 93 of the communication antenna 83.

An overlapping amount W of the first RFID tag D1 and the second RFID tag D2 is preferably less than or equal to 85% of an area in which the antenna coil 73*a* of the first RFID tag D1 is provided. This is because, if the overlapping amount exceeds 85%, there is a possibility that communication failure may occur between the first RFID tag D1 and the communication antenna 83 or between the second RFID tag D2 and the communication antenna 83.

In Embodiment 1, the antenna coil 73*a* (as the first antenna unit) of the first RFID tag D1 is configured so that coils are wound at substantially constant pitch in both the horizontal direction and the vertical direction with respect to the IC chip 72. An area density of the antenna coil 73*a* with respect to the area of the first RFID tag D1 is substantially uniform except a center portion where the IC chip 72 is provided. The second RFID tag D2 can be configured in a similar manner to the first RFID tag D1.

Since the first RFID tag D1 and the second RFID tag D2 have the IC chips 72 at center portions, areas where the antenna coils 73*a* and 73*b* are formed at low density (i.e., the center portions) are located at the overlapping area of the first RFID tag D1 and the second RFID tag D2. Therefore, the overlapping amount of the first RFID tag D1 and the second RFID tag D2 can be increased (i.e., mounting area thereof can be reduced), and communication failure can be prevented. Further, the first RFID tag D1 and the second RFID tag D2 can be formed of common components.

In Embodiment 1, a total length L of the first RFID tag D1 and the second RFID tag D2 in an overlapping direction (i.e., the X direction) is 15 mm. A length W of the overlapping area of the first RFID tag D1 and the second RFID tag D2 in the X direction is 10 mm. Further, a length d of a non-overlapping area in the X direction is mm.

<Advantages>

As described above, the communication system of Embodiment 1 is so configured that the communication antenna 83 as the reading unit is disposed at a position where the communication antenna 83 can read information from the first fitting unit 56 and the information from the second fitting unit 66. Therefore, it becomes possible to read information from both of the first RFID tag D1 and the second RFID tag D2 (i.e., a plurality of storage units) using a single communication antenna 83.

In this regard, if an output level of the communication antenna 83 is raised or the size of the communication antenna 83 is increased, a communicable area of the communication antenna 83 increases. In such a case, the communication antenna 83 may receive electromagnetic waves from the RFID tag D1 or D2 belonging to another communication group, which produces noise in reading information. In order to suppress such noise, the information processing apparatus is necessarily provided with a noise suppression system, which may result in an increase in manufacturing cost and electric power consumption.

However, according to the printer 1 of Embodiment 1, the communication antenna 83 is disposed so as to face the first fitting unit 56 and the second fitting unit 66. With such a configuration, it becomes possible to read information from both of the first RFID tag D1 and the second RFID tag D2 as the plurality of storage units using a single communication antenna 83 whose output level is relatively low and whose size is relatively small. Therefore, noise in reading information can be suppressed without increasing the manufacturing cost or electric power consumption.

Further, the communication antenna 83 can be disposed so as to face the overlapping portion of the first RFID tag D1 and the second RFID tag D2 as shown in FIG. 13B. With such a configuration, the size (area) of the communication antenna 83 can be reduced, while ensuring that the communication antenna 83 can perform communication with both of the first RFID tag D1 and the second RFID tag D2. Since the number of the communication antennas 83 can be reduced, components of the printer 1 for communication can be reduced.

In Embodiment 1, the position of the communication antenna 83 with respect to the first RFID tag D1 and the second RFID tag D2 is determined in the X direction (i.e., the overlapping direction of the RFID tags D1 and D2) using the first positioning portion 58*b*, the second positioning portion 202*b*, the third positioning portions 20A and 20B, and the fourth positioning portions M1 and M2.

With such a configuration, a communication failure can be prevented while reducing the area of the antenna coil 93 (i.e., the receiving portion) of the communication antenna 83. Further, by positioning the first RFID tag D1, the second RFID tag D2 and the communication antenna 83 in the Y direction substantially perpendicular to the X direction, the area of the antenna coil 93 in the Y direction can be precisely determined. Therefore, the area of the antenna coil 93 in the Y direction can be further reduced.

Moreover, when the toner cartridge 61 is mounted to the developing unit 20, the inclined surface 58*a* of the first lid 58 and the second inclined surface 68*a* of the second lid 68 guide the first fitting portion 56 of the developing unit 20 and the second fitting portion 66 of the toner cartridge 61. Therefore, the developing unit 20 and the toner cartridge 61 can be precisely positioned at predetermined positions. Thus, positioning accuracy of the RFID first tag D1 mounted in the first fitting portion and the second RFID tag D2 mounted in the second fitting portion 66 with respect to each other and with respect to the communication antenna 83 can be enhanced. Accordingly, communication can be performed even with weak electromagnetic waves. Thus, communication failure between the communication antenna 83 and either of the first RFID tag D1 and the second RFID tag D2 can be prevented.

In the printer 1, the first fitting portion 56 of the developing unit 20 stores the first RFID tag D1, the second fitting portion 66 of the toner cartridge 61 stores the second RFID tag D2, and the first fitting portion 56 and the second fitting portion 66 fit each other in the vicinity of the communication antenna 83. With such a configuration, the first RFID tags D1 and the second RFID tags D2 can be mounted to the printer 1 in high density. Further, even when the size of the communication antenna 83 is reduced, communication can be performed with weak electromagnetic waves between the communication antenna 83 and both of the first RFID tag D1 and the second RFID tag D2.

Moreover, the printer 1 is so configured as to position the first RFID tag D1 and the second RFID tag D2 at predetermined positions using the first fitting portion 56 and the second fitting portion 66. Therefore, positioning accuracy of the first RFID tag D1 and the second RFID tag D2 with respect to each other, positioning accuracy of the first RFID tag D1 with respect to the communication antenna 83 and the positioning accuracy of the second RFID tag D2 with respect to the communication antenna 83 can be enhanced. Accordingly, communication can be performed even with weak electromagnetic waves, so that communication failure can be prevented even when the output of the communication antenna 83 is reduced.

Further, the number of components of the printer 1 for communication can be reduced, and a configuration of the printer 1 for communication can be simplified. Thus, increase in manufacturing cost of the printer 1 can be suppressed, and the printer 1 can be provided at low cost.

As described above, according to the printer 1 of Embodiment 1, communication with both of the data carriers (for example, the first RFID tag D1 and the second RFID tag D2) mounted to the replaceable units (for example, developing unit 20 and the toner cartridge 61) can be ensured using the communication antenna 83 whose output is relatively small.

<Modifications>

Figure 14A:
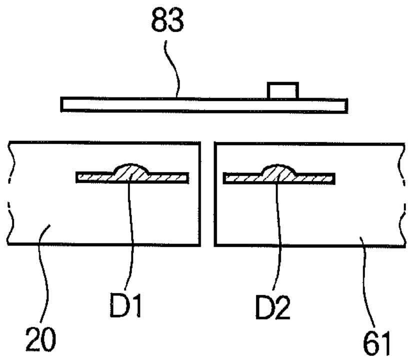
FIGS. 14A and 14B are schematic views showing modifications of Embodiment 1 of the present invention.

In the above description, the first RFID tag D1 and the second RFID tag D2 (i.e., the data carriers) are disposed so as to overlap each other as shown in FIG. 12A. However, it is also possible that the first RFID tag D1 and the second RFID tag D2 (i.e., the data carriers) are juxtaposed with each other without overlapping as shown in FIG. 14A.

Figure 14B:
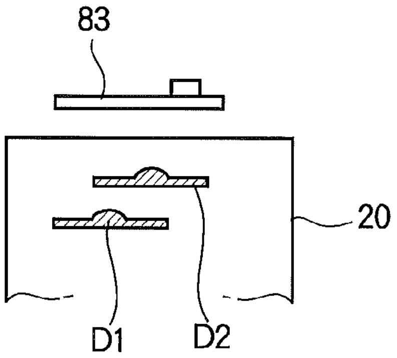

Further, in the above description, the first RFID tag D1 is provided on the developing unit 20, and the second RFID tag D2 is provided on the toner cartridge 61. However, it is also possible that the first RFID tag D1 and the second RFID tag D2 are provided on the same unit (for example, the developing unit 20) as shown in FIG. 14B.

Embodiment 2

Configurations of toner cartridges 61Aa and 61Ab as examples of replaceable units and a printer 1A as an example of an information processing apparatus according to Embodiment 2 will be described with reference to FIGS. 15 and 16.

Figure 15:
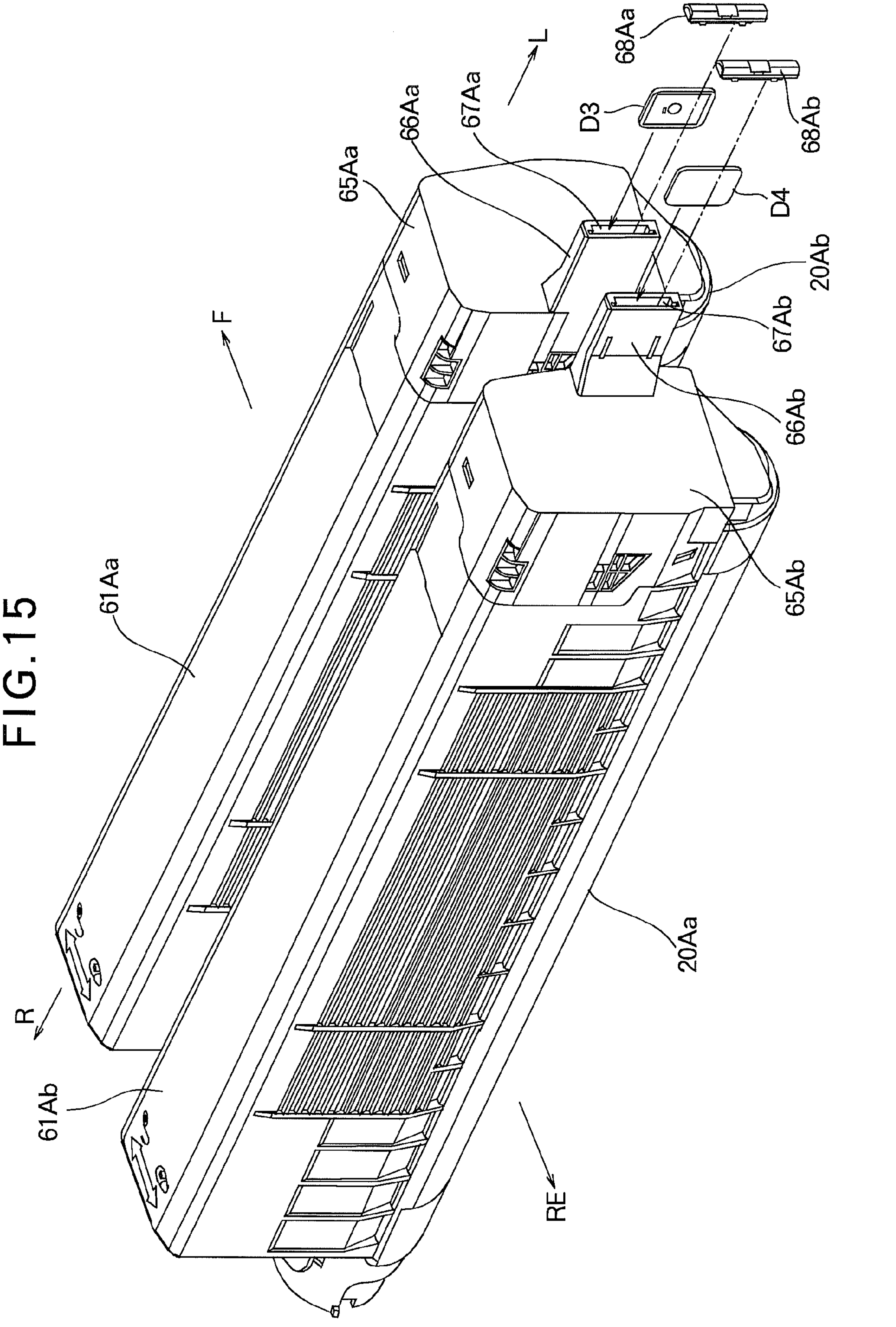
FIG. 15 is a perspective view showing configurations of toner cartridges as replaceable units according to Embodiment 2 of the present invention.

FIG. 15 is a perspective view showing the toner cartridges 61Aa and 61Ab as the replaceable units according to Embodiment 2. FIG. 16 is a perspective view showing parts of the toner cartridges 61Aa and 61Ab and the printer 1A according to Embodiment 2. To be more specific, FIG. 16 is a top perspective view showing a state where a third fitting portion 66Aa of the toner cartridge 61Aa and a fourth fitting portion 66Ab of the toner cartridge 61Ab are inserted into a first insertion opening 103*a* and a second insertion opening 103*b* of the printer 1A.

The toner cartridge 61Aa (i.e., a third replaceable unit) is also referred to as a first unit. The toner cartridge 61Ab (i.e., a fourth replaceable unit) is also referred to as a second unit. The third fitting portion 66Aa and the fourth fitting portion 66Ab are also referred to as a first fitting portion and a second fitting portion.

Figure 16:
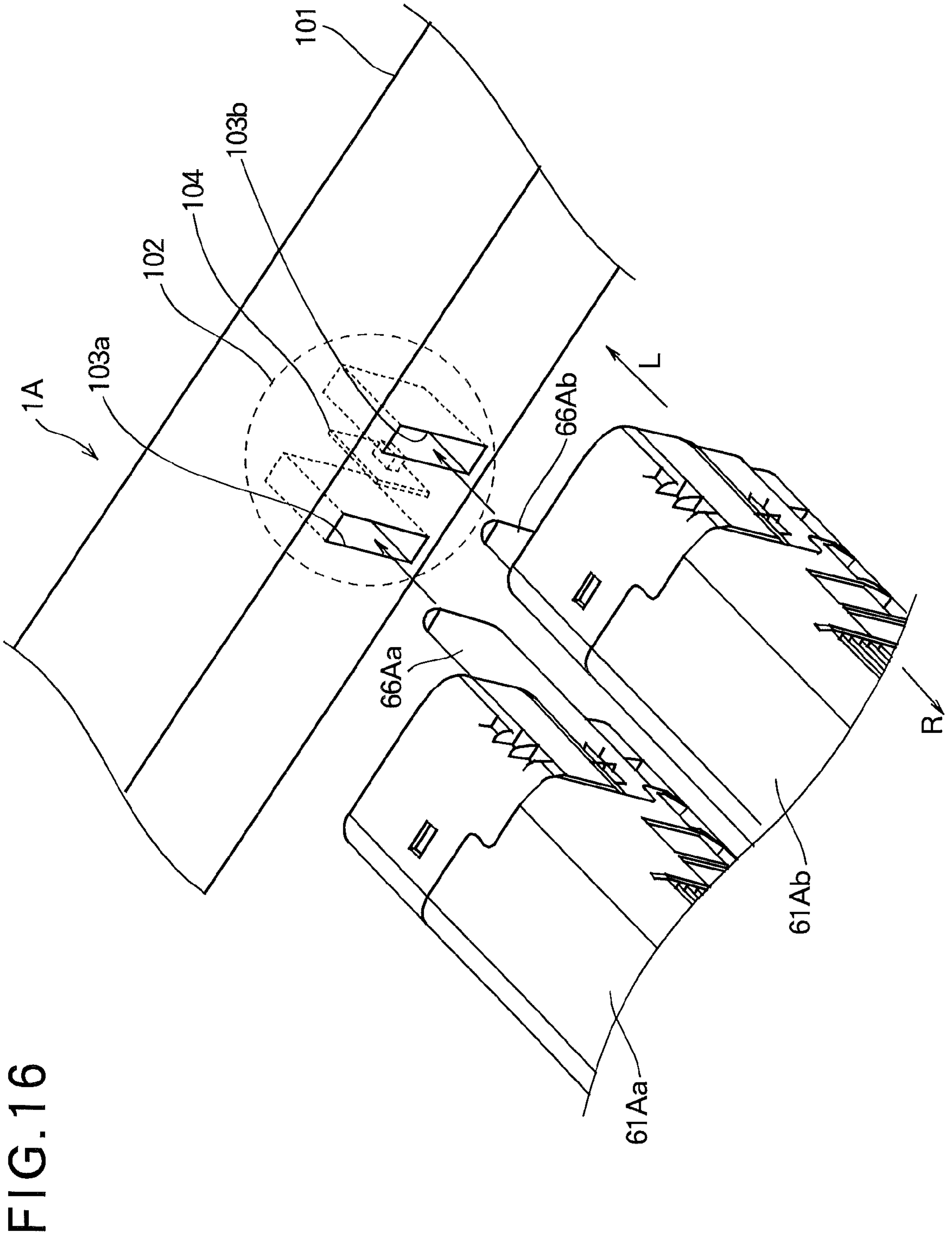
FIG. 16 is an enlarged view showing configurations of parts of the toner cartridges according to Embodiment 2 of the present invention.

As shown in FIGS. 15 and 16, the toner cartridge 61Aa and 61Ab are used as a pair. To be more specific, among four toner cartridges 61A of the printer 1A, two adjacent toner cartridges 61A are defined as a pair of the toner cartridges 61Aa and 61Ab, and another adjacent two toner cartridges 61A are defined as another pair of the toner cartridges 61Aa and 61Ab. For example, among four toner cartridges 61A of black, yellow, magenta and cyan (see the toner cartridges 61K, 61Y, 61M and 61C shown in FIG. 1) of the printer 1A, the toner cartridges. 61A of black and yellow are defined as a pair of the toner cartridges 61Aa and 61Ab, and the toner cartridges 61A of magenta and cyan are defined as another pair of the toner cartridges 61Aa and 61Ab. Hereinafter, when distinction among colors is necessary, the toner cartridges 61A of black, yellow, magenta and cyan will be referred to as the toner cartridges 61AaK, 61AbY, 61AaM and 61AbC.

The toner cartridge 61Aa has a side frame 65Aa defining a side surface thereof. The third fitting portion 66Aa in the form of a protrusion is provided on an outer surface of the side frame 65Aa. The third fitting portion 66Aa is inserted into the first insertion opening 103*a* (FIG. 16) of the printer 1A. The third fitting portion 66Aa protrudes in the longitudinal direction (i.e., laterally) of the toner cartridge 61Aa from the outer surface of the side frame 65Aa.

A tag mounting portion 67Aa is provided in the third fitting portion 66Aa. The tag mounting portion 67Aa is a space in which a third RFID tag D3 is mounted. The third RFID tag D3 (i.e., a storage unit) is so configured that information stored therein can be read using wireless communication. The third RFID tag D3 (i.e., a third data carrier) stores management information regarding the toner cartridge 61Aa, and has the same configuration as the second RFID tag D2 according to Embodiment 1. The third RFID tag D3 is also referred to as a first storage unit.

The third fitting portion 66Aa has a third lid 68Aa covering the tag mounting portion 67Aa for preventing the third RFID tag D3 from dropping out of the tag mounting portion 67Aa.

The toner cartridge 61Ab has a side frame 65Ab defining a side surface thereof. The fourth fitting portion 66Ab in the form of a protrusion is provided on an outer surface of the side frame 65Ab. The fourth fitting portion 66Ab is inserted into the second insertion opening 103*b* (FIG. 16) of the printer 1A. The fourth fitting portion 66Ab protrudes in the longitudinal direction (i.e., laterally) of the toner cartridge 61Ab from the outer surface of the side frame 65Ab.

A tag mounting portion 67Ab is provided in the fourth fitting portion 66Ab. The tag mounting portion 67Ab is a space in which a fourth RFID tag D4 is mounted. The fourth RFID tag D4 (i.e., a storage unit) is so configured that information stored therein can be read using wireless communication. The fourth RFID tag D4 (i.e., a fourth data carrier) stores management information regarding the toner cartridge 61Ab, and has the same configuration as the second RFID tag D2 according to Embodiment 1. The fourth RFID tag D4 is also referred to as a second storage unit.

The fourth fitting portion 66Ab has a fourth lid 68Ab covering the tag mounting portion 67Ab for preventing the fourth RFID tag D4 from dropping out of the tag mounting portion 67Ab.

The developing units 20 to which the toner cartridges 61Aa and 61Ab are mounted have configurations in which the side plates 51L (FIG. 4) have substantially symmetrical shapes with the side plates 51R.

In Embodiment 2, as shown in FIG. 16, a casing 101 of the printer 1A has two main body fitting portions 102. One of the main body fitting portions 102 is disposed so as to contact respective ends of the toner cartridge 61AaK and 61AbY. The other of the main body fitting portions 102 is disposed so as to contact respective ends of the toner cartridge 61AaM and 61AbC. Only one of the main body fitting portions 102 is shown in FIG. 16. The main body fitting portion 102 fits the third fitting portion 66Aa of the toner cartridge 61Aa and the fourth fitting portion 66Ab of the toner cartridge 61Ab. The printer 1A has the same configuration as the printer 1 (FIG. 1) except that the printer 1A has the main body fitting portions 102.

Each of the main body fitting portion 102 has the first insertion opening 103*a*, the second insertion opening 103*b* and a communication antenna 104. The first insertion opening 103*a* is an opening into which the third fitting portion 66Aa of the toner cartridge 61Aa is inserted. The second insertion opening 103*b* is an opening into which the fourth fitting portion 66Ab of the toner cartridge 61Ab is inserted. The communication antenna 104 is in the form of a planer antenna, and is used for communication between the printer 1A and the third RFID tag D3 and the fourth RFID tag D4.

The printer 1A of Embodiment 2 is configured to perform communication with the third RFID tag D3 and the fourth RFID tag D4 using the single communication antenna 104 as is the case with the printer 1 of Embodiment 1. Such a configuration contributes to reducing the number of communication antennas 104.

With such a configuration, one communication antenna 104 and two data carriers (i.e., the third RFID tag D3 and the fourth RFID tag D4) provided in the vicinity thereof constitute a single communication group. The printer 1 includes a plurality of such communication groups. The communication antennas 104 are configured to output weak electromagnetic waves so that no interference occurs between the communication groups, as is the case with the communication antennas 83 of Embodiment 1.

For this reason, the communication antenna 104 (FIG. 15) is provided in the vicinity of the third RFID tag D3 and the fourth RFID tag D4 (FIG. 15), and is substantially parallel with the third RFID tag D3 and the fourth RFID tag D4 as shown in FIG. 16. In the printer 1A of Embodiment 2, the communication antenna 104 is provided substantially parallel with the first insertion opening 103*a* and the second insertion opening 103*b* as shown in FIG. 16. The term "substantially parallel" means being predetermined angle (in this example, ±10 degrees) or less from being parallel. The third fitting portion 66Aa having the third RFID tag D3 is inserted into the first insertion opening 103*a*, and the fourth fitting portion 66Ab having the fourth RFID tag D4 is inserted into the second insertion opening 103*b*. As a result, the communication antenna 104 is disposed in the vicinity of the third RFID tag D3 and the fourth RFID tag D4 and is substantially parallel with the third RFID tag D3 and the fourth RFID tag D4.

When the user replaces the toner cartridge 61Aa, the user inserts the third fitting portion 66Aa of the toner cartridge 61Aa into the first insertion opening 103*a*. Further, when the user replaces the toner cartridge 61Ab, the user inserts the fourth fitting portion 66Ab of the toner cartridge 61Ab into the second insertion opening 103*b*.

With such an operation, the third RFID tag D3 and the fourth RFID tag D4 are disposed in a communicable area of the communication antenna 104, and are substantially parallel with the communication antenna 104.

Figure 17:
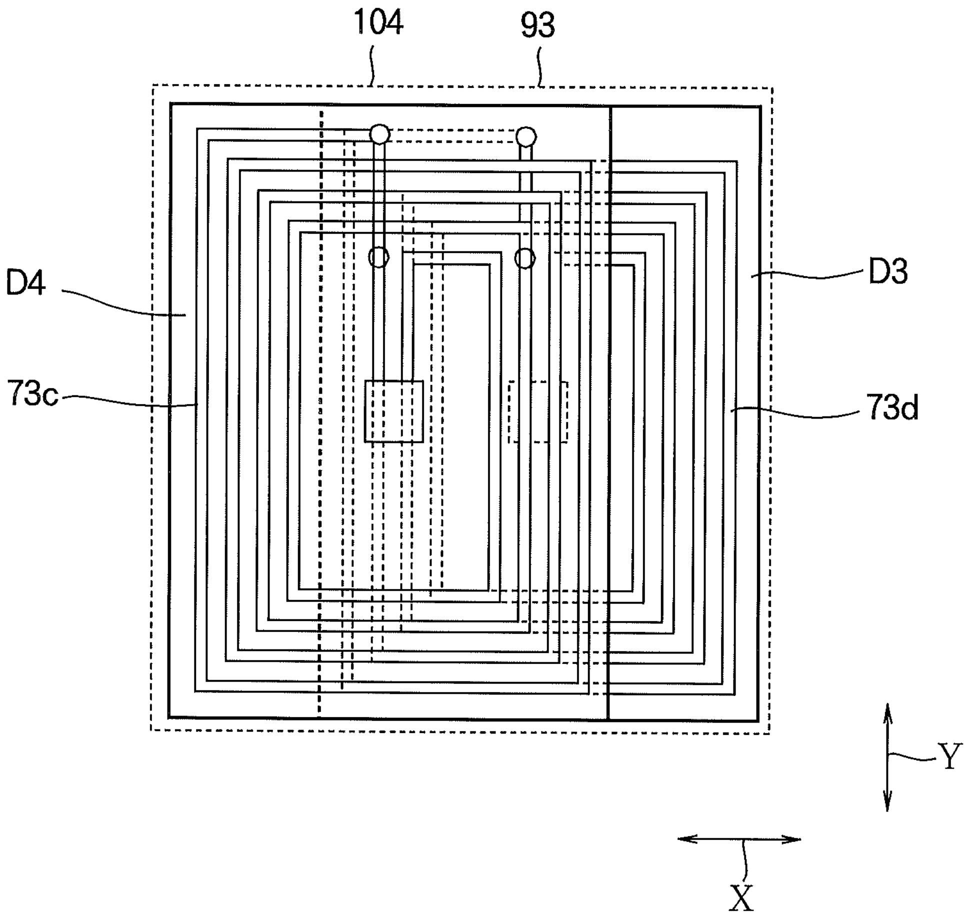
FIG. 17 is a schematic view showing a relationship between the communication antenna and the data carriers mounted to the toner cartridges according to Embodiment 2 of the present invention.

Here, a size of the communication antenna 104 with respect to the third RFID tag D3 and the fourth RFID tag D4 will be described with reference to FIG. 17. FIG. 17 shows a relationship between the size of the communication antenna 104 and the size of the third RFID tag D3 and the fourth RFID tag D4 (i.e., the data carriers) mounted to the toner cartridges 61Aa and 61Ab (i.e., the replaceable units).

In Embodiment 2, the antenna coil 93 of the communication antenna 104 is disposed so as to overlap an antenna coil 73*c* of the third RFID tag D3 and an antenna coil 73*d* of the fourth RFID tag D4 as seen from the communication antenna 104 side.

However, if the antenna coil 73*c* and the antenna coil 73*d* completely overlap each other, a communication failure may occur at the communication antenna 104. Therefore, the third RFID tag D3 and the fourth RFID tag D4 are disposed at positions mutually shifted in a horizontal direction (X direction), a vertical direction (Y direction), or an oblique direction so that the antenna coil 73*c* and the antenna coil 73*d* partially (not completely) overlap each other. That is, the third RFID tag D3 and the fourth RFID tag D4 are disposed so that the antenna coil 73*c* and the antenna coil 73*d* partially overlap each other. Further, the third RFID tag D3 and the fourth RFID tag D4 are disposed in the communicable area of the communication antenna 104, and are disposed substantially parallel with the antenna coil 93 of the communication antenna 104.

As described above, the communication system of Embodiment 2 is so configured that the communication antenna 104 as the reading unit faces a portion where the third fitting unit 66Aa (as a first unit fitting portion) and the fourth fitting unit 66Ab (i.e., a second unit fitting portion) fit each other. Therefore, it becomes possible to read information from both of the third RFID tag D3 and the fourth RFID tag D4 (i.e., a plurality of storage units) using a single communication antenna 104.

Further, the communication antenna 104 can be disposed so as to face the portion where the third RFID tag D3 and the fourth RFID tag D4 overlap each other. With such a configuration, the size (area) of the communication antenna 104 can be reduced, while ensuring that the communication antenna 104 can perform communication with both of the third RFID tag D3 and the fourth RFID tag D4. Since the number of the communication antennas 104 can be reduced, components of the printer 1A for communication can be reduced.

Moreover, the third fitting portion 66Aa of the toner cartridge 61Aa is inserted into the first insertion opening 103*a* of the printer 1A, and the fourth fitting portion 66Ab of the toner cartridge 61Ab is inserted into the second insertion opening 103*b* of the printer 1A. With such a configuration, the toner cartridges 61Aa and 61Ab are positioned at predetermined positions in the vicinity of each other. Therefore, the third RFID tag D3 mounted in the third mounting portion 66Aa and the fourth RFID tag D4 mounted in the fourth mounting portion 66Ab are precisely positioned with respect to each other, and with respect to the communication antenna 104. Accordingly, communication can be performed even with weak electromagnetic waves. Thus, communication failure between the communication antenna 104 and either of the third RFID tag D3 and the fourth RFID tag D4 can be prevented.

Further, the third RFID tags D3 and the fourth RFID tags D4 can be mounted to the printer 1A in high density, as is the case with the printer 1 of Embodiment 1. Further, even when the size of the communication antenna 104 is reduced, communication can be performed weak electromagnetic waves between the communication antenna 104 and both of the third RFID tag D3 and the fourth RFID tag D4.

Moreover, as is the case with the printer 1 of Embodiment 1, positioning accuracy of the third RFID tag D3 and the fourth RFID tag D4 with respect to each other, positioning accuracy of the third RFID tag D3 with respect to the communication antenna 104, and the positioning accuracy of the fourth RFID tag D4 with respect to the communication antenna 104 can be enhanced. Accordingly, communication can be performed even with weak electromagnetic waves, so that communication failure can be prevented even when the output of the communication antenna 104 is reduced.

Furthermore, the number of components of the printer 1A for communication can be reduced, and a configuration of the printer 1A for communication can be simplified. Thus, increase in manufacturing cost of the printer 1A can be suppressed, and the printer 1A can be provided at low cost.

As described above, according to the printer 1A of Embodiment 2, it is ensured that communication with both of the data carriers (for example, the third RFID tag D3 and the fourth RFID tag D4) mounted to the replaceable units (for example, the toner cartridges 61Aa and 61Ab) can be performed using the communication antenna 104 whose output is relatively small.

<Modifications>

The present invention is not limited to the above described embodiments, but modifications and improvements may be made to the invention.

For example, in Embodiment 1, the developing unit 20 and the toner cartridge 61 have been described as the replaceable units. In Embodiment 2, the toner cartridges 61Aa and 61Ab have been described as the replaceable units. However, the present invention is not limited to these examples. The replaceable units can be a combination of components mounted to positions in the vicinity of each other, for example, a combination of the developing unit 20 and the transfer unit 30, a combination of the transfer unit 30 and the fixing unit 40, or a combination of a first feeding tray and a second feeding tray. Therefore, the present invention is not only used to manage the toner cartridges 61, 61Aa and 61Ab, but can also be used to manage other replaceable units. For example, it is also possible to mount the data carriers to other replaceable units (for example, the developing unit 20, the transfer unit 30 or not shown power source units), and to manage usage, lifetime or other information of the replaceable units for the purpose of recycling.

Further, the present invention is applicable to an image forming apparatus such as a printer, a facsimile machine, a copier, or an MFP (Multi-Function Peripheral). In this regard, the MFP is an apparatus having functions of a printer, a facsimile, a scanner, a copier and the like.

Furthermore, the present invention is not limited to the image forming apparatus, but can be applicable to an information processing apparatus configured to perform communication with at least two data carriers via a communication antenna. Further, information stored in the data carriers can be modified depending on application.

The information processing apparatus preferably includes a communication antenna for communication with two data carriers mounted to two replaceable units, and an information processing unit performing predetermined operations based on the communication with the data carriers. Antennas of the data carriers are preferably disposed in the vicinity of the communication antenna so as to be substantially parallel to the communication antenna.

In the information processing apparatus, it is preferred that the two data carriers and the communication antenna, which are disposed in the vicinity of each other, constitute a single communication group, and the printer has a plurality of such communication groups. The communication antenna preferably outputs weak electromagnetic waves so that no interference occurs between communications of the communication groups.

In the information processing apparatus, the two antennas of the data carriers and the communication antenna preferably have planer shapes. The two data carriers preferably partially overlap each other, and the communication antenna is preferably disposed so as to face the overlapping portion of the data carriers.

When one of the two data carriers is referred to as a first data carrier and the other is referred to as a second data carrier, the information processing apparatus preferably includes a first fitting portion holding the first data carrier and a second fitting portion holding the second data carrier. The first fitting portion is preferably provided on a first replaceable unit detachably mounted to the information processing apparatus, and the second fitting portion is preferably provided on a second replaceable unit detachably mounted to the first replaceable unit. The first fitting portion and the second fitting portion preferably have inclined portions at ends thereof for guiding the first fitting portion and the second fitting portion to respectively predetermined positions.

Further, the information processing apparatus preferably includes a casing having a first insertion opening and a second insertion opening in a communicable area of the communication antenna. The first insertion opening and the second insertion opening are preferably disposed substantially parallel to the communication antenna. When one of the two data carriers is referred to as a third data carrier and the other is referred to as a fourth data carrier, the information processing apparatus preferably includes a third fitting portion holding the third data carrier and a fourth fitting portion holding the fourth data carrier. The third fitting portion is preferably provided on a first unit detachably mounted to the information processing apparatus, and is inserted into the first insertion opening of the casing. The fourth fitting portion is preferably provided on a second unit detachably mounted to the information processing apparatus, and is inserted into the second insertion opening of the casing.

The image forming apparatus is preferably configured to form an image on a media, and is preferably includes a communication antenna for communication with two data carriers mounted to two replaceable units, and an information processing unit performing predetermined operations based on the communication with the data carriers. Antennas of the data carriers are preferably disposed in the vicinity of the communication antenna so as to be substantially parallel to the communication antenna.

In the image forming apparatus, it is preferred that the two data carriers and the communication antenna, which are disposed in the vicinity of each other, constitute a single communication group, and the printer has a plurality of such communication groups. The communication antenna preferably outputs weak electromagnetic waves so that no interference occurs between communications of the communication groups.

In the image forming apparatus, the two antennas of the data carriers and the communication antenna preferably have planer shapes. The two data carriers preferably partially overlap each other, and the communication antenna is preferably disposed so as to face the overlapping portion of the data carriers.

When one of the two data carriers is referred to as a first data carrier and the other is referred to as a second data carrier, the image forming apparatus preferably includes a first fitting portion holding the first data carrier and a second fitting portion holding the second data carrier. The first fitting portion is preferably provided on a first replaceable unit detachably mounted to the image forming apparatus, and the second fitting portion is preferably provided on a second replaceable unit detachably mounted to the first replaceable unit. The first fitting portion and the second fitting portion preferably have inclined portions at ends thereof for guiding the first fitting portion and the second fitting portion to respectively predetermined positions.

In the image forming apparatus, the first replaceable unit is preferably configured as a developing unit (i.e., an image forming unit) having an image bearing body, and the second replaceable unit is preferably configured as a developer storage container that stores a developer therein and supplies the developer to the developing unit.

Further, the image forming apparatus preferably includes a casing having a first insertion opening and a second insertion opening in a communicable area of the communication antenna. The first insertion opening and the second insertion opening are preferably disposed substantially parallel to the communication antenna. When one of the two data carriers is referred to as a third data carrier and the other is referred to as a fourth data carrier, the image forming apparatus preferably includes a third fitting portion holding the third data carrier and a fourth fitting portion holding the fourth data carrier. The third fitting portion is preferably provided on a first unit detachably mounted to the image forming apparatus, and is inserted into the first insertion opening of the casing. The fourth fitting portion is preferably provided on a second unit detachably mounted to the image forming apparatus, and is inserted into the second insertion opening of the casing.

In the image forming apparatus, the first unit and the second unit are preferably configured as developer storage containers that store developers therein and supply the developers to developing units.

The image forming apparatus preferably includes two first units and two second units containing developers of mutually different colors. The first units and the second units are preferably arranged alternately with each other.

While the preferred embodiments of the present invention have been illustrated in detail, it should be apparent that modifications and improvements may be made to the invention without departing from the spirit and scope of the invention as described in the following claims.

What is claimed is:

1. An information processing apparatus comprising:

a first storage unit that stores first information associated with a first unit;

a second storage unit that stores second information associated with a second unit; and a reading unit disposed so as to face said first storage unit and said second storage unit;

wherein said first storage unit is disposed in the vicinity of said second storage unit, and said first storage unit faces said second storage unit;

wherein said first storage unit and said second storage unit are both disposed in a communicable area in the vicinity of said reading unit at the same time;

wherein said reading unit reads said first information stored in said first storage unit and said second information stored in said second storage unit; and wherein one of said first storage unit and said second storage unit is disposed between said reading unit and the other of said first storage unit and said second storage unit.

2. The information processing apparatus according to claim 1, wherein:

said first unit has a first fitting portion, and said second unit has a second fitting portion; and said first fitting portion and said second fitting portion fit each other so as to form a unit fitting area.

3. The information processing apparatus according to claim 2, wherein said first storage unit is mounted to said first fitting portion, and said second storage unit is mounted to said second fitting portion.

4. The information processing apparatus according to claim 3, wherein said unit fitting area is disposed so as to face said reading unit.

5. The information processing apparatus according to claim 3, wherein said first fitting portion and said second fitting portion have inclined portions at ends thereof.

6. The information processing apparatus according to claim 3, wherein said second unit is detachably mounted to said first unit.

7. The information processing apparatus according to claim 6, wherein:

said first fitting portion has a first positioning portion, and said second fitting portion has a second positioning portion; and said first positioning portion and said second positioning portion contact each other so as to determine a position of said second unit with respect to said first unit.

8. The information processing apparatus according to claim 1, wherein said first unit has said first storage unit, and said second unit has said second storage unit.

9. The information processing apparatus according to claim 1, wherein each of said first storage portion and said second storage portion includes a substrate, a memory member disposed at a substantial center portion of said substrate, and an antenna portion extending from said memory portion toward a periphery of said substrate.

10. The information processing apparatus according to claim 1, wherein:

said reading unit includes a communication antenna for communication with said first storage unit and said second storage unit; and said communication antenna is disposed so as to be substantially parallel with said first storage unit and said second storage unit.

11. The information processing apparatus according to claim 1, wherein:

said second unit is a developer storage container storing a developer therein; and said first unit is an image forming unit that forms a developer image using said developer stored in said developer storage container.

12. The information processing apparatus according to claim 1, wherein said first unit is detachably mounted to said information processing apparatus.

13. The information processing apparatus according to claim 1, wherein said first unit and said second unit are developer storage containers storing developers therein.

14. The information processing apparatus according to claim 1, wherein said first storage unit and said second storage unit are disposed so that angles relative to said reading unit are within ±10 degrees.

15. The information processing apparatus according to claim 1, wherein:

said reading unit is mounted in a holder portion; and said holder portion is provided on an upper cover of said information processing apparatus for holding an exposure unit.

16. The information processing apparatus according to claim 1, wherein said reading unit has an antenna having a size covering both antennas of said first storage unit and said second storage unit.

17. The information processing apparatus according to claim 1, wherein antennas of said first storage unit and said second storage unit partially overlap each other.

18. The information processing apparatus according to claim 17, wherein an overlapping amount of said antennas of said first storage unit and said second storage unit is less than or equal to 85% of an area in which said antenna of said first storage unit is provided.

19. An information processing apparatus comprising:

a first storage unit that stores first information associated with a first unit;

a second storage unit that stores second information associated with a second unit; and a reading unit that reads said first information stored in said first storage unit and said second information stored in said second storage unit;

wherein said first storage unit is disposed in the vicinity of said second storage unit, and said first storage unit faces said second storage unit;

wherein said reading unit is disposed in the vicinity of and faces a side of one of said first storage unit and said second storage unit;

wherein said side faces away from the other of said first storage unit and said second storage unit; and wherein said first storage unit and said second storage unit are disposed so that angles relative to said reading unit are within ±10 degrees.

20. The information processing apparatus according to claim 19, wherein:

said first unit has a first fitting portion, and said second unit has a second fitting portion; and said first fitting portion and said second fitting portion fit each other so as to form a unit fitting area.

21. The information processing apparatus according to claim 20, wherein said first storage unit is mounted to said first fitting portion, and said second storage unit is mounted to said second fitting portion.

22. The information processing apparatus according to claim 21, wherein said unit fitting area is so disposed that said reading unit is capable of reading said first information stored in said first storage unit and said second information stored in said second storage unit.

23. The information processing apparatus according to claim 19, wherein said first unit has said first storage unit, and said second unit has said second storage unit.

24. The information processing apparatus according to claim 19, wherein:

said reading unit is mounted in a holder portion; and said holder portion is provided on an upper cover of said information processing apparatus for holding an exposure unit.

25. The information processing apparatus according to claim 19, wherein antennas of said first storage unit and said second storage unit partially overlap each other.

26. The information processing apparatus according to claim 25, wherein an overlapping amount of said antennas of said first storage unit and said second storage unit is less than or equal to 85% of an area in which said antenna of said first storage unit is provided.

27. An information processing apparatus comprising:

a first storage unit that stores first information associated with a first unit;

a second storage unit that stores second information associated with a second unit; and a reading unit that reads said first information stored in said first storage unit and said second information stored in said second storage unit;

wherein said first storage unit is disposed in the vicinity of said second storage unit, and said first storage unit faces said second storage unit;

wherein said reading unit is disposed in the vicinity of and faces a side of one of said first storage unit and said second storage unit;

wherein said side faces away from the other of said first storage unit and said second storage unit; and wherein said reading unit has an antenna having a size covering both antennas of said first storage unit and said second storage unit.

28. The information processing apparatus according to claim 27, wherein:

said first unit has a first fitting portion, and said second unit has a second fitting portion; and said first fitting portion and said second fitting portion fit each other so as to form a unit fitting area.

29. The information processing apparatus according to claim 28, wherein said first storage unit is mounted to said first fitting portion, and said second storage unit is mounted to said second fitting portion.

30. The information processing apparatus according to claim 29, wherein said unit fitting area is disposed so that said reading unit is capable of reading said first information stored in said first storage unit and said second information stored in said second storage unit.

31. The information processing apparatus according to claim 27, wherein said first unit has said first storage unit, and said second unit has said second storage unit.

32. The information processing apparatus according to claim 27, wherein:

said reading unit is mounted in a holder portion; and said holder portion is provided on an upper cover of said information processing apparatus for holding an exposure unit.

33. The information processing apparatus according to claim 27, wherein antennas of said first storage unit and said second storage unit partially overlap each other.

34. The information processing apparatus according to claim 33, wherein an overlapping amount of said antennas of said first storage unit and said second storage unit is less than or equal to 85% of an area in which said antenna of said first storage unit is provided.

* * * * *